(12) United States Patent
Laipple et al.

(10) Patent No.: US 8,789,841 B2
(45) Date of Patent: Jul. 29, 2014

(54) TOOL-LESS PEDAL ASSEMBLY

(75) Inventors: Mark A. Laipple, Centerville, OH (US); Robert L. Diekman, Springboro, OH (US)

(73) Assignee: Huffy Corporation, Centerville, OH (US)

( * ) Notice: Subject to any disclaimer, the term of this patent is extended or adjusted under 35 U.S.C. 154(b) by 0 days.

(21) Appl. No.: 13/588,548

(22) Filed: Aug. 17, 2012

(65) Prior Publication Data
US 2013/0043665 A1 Feb. 21, 2013

Related U.S. Application Data

(63) Continuation-in-part of application No. PCT/US2011/024458, filed on Feb. 11, 2011.

(60) Provisional application No. 61/305,741, filed on Feb. 18, 2010, provisional application No. 61/408,873, filed on Nov. 1, 2010.

(51) Int. Cl.
*B62H 1/08* (2006.01)

(52) U.S. Cl.
USPC ......... 280/294; 280/259; 74/594.1; 74/594.4; 74/594.7; 74/600; 403/329; 403/297

(58) Field of Classification Search
USPC ........... 280/294, 259; 74/594.1, 594.4, 594.7, 74/600; 403/329, 397, DIG. 14
See application file for complete search history.

(56) References Cited

U.S. PATENT DOCUMENTS

| 1,531,916 | A | | 3/1925 | Flintjer |
| 3,158,964 | A | | 12/1964 | Haas |
| 5,440,950 | A | * | 8/1995 | Tranvoiz ...................... 74/594.4 |
| 6,443,033 | B1 | * | 9/2002 | Brummer et al. ............ 74/594.1 |
| 6,612,201 | B1 | * | 9/2003 | Chen ............................ 74/594.4 |
| 6,705,813 | B2 | | 3/2004 | Schwab |
| 6,708,998 | B1 | * | 3/2004 | Blake ............................ 280/259 |
| 6,783,314 | B2 | | 8/2004 | Gattone |

(Continued)

FOREIGN PATENT DOCUMENTS

| CN | 101519107 A | 12/2008 |
| JP | 5-71089 U | 9/1993 |

OTHER PUBLICATIONS

International Searching Authority, International Preliminary Report on Patentability issued in corresponding PCT/US2011/024458 dated Aug. 21, 2012, 7 pages.

(Continued)

*Primary Examiner* — Joseph M Rocca
*Assistant Examiner* — Marlon Arce
(74) *Attorney, Agent, or Firm* — Wood, Herron & Evans, LLP

(57) ABSTRACT

A pedaled vehicle includes a frame, a wheel rotatably coupled to the frame, a crank assembly operatively coupled to the wheel and having a bore, a pedal received in the bore, and a spring clip for securing the pedal to the crank assembly. The spring clip includes at least one flexible tab or leg capable of flexing between a first configuration, where the spring clip allows a shaft of the pedal to pass through the bore, and a second configuration, where the pedal shaft is prevented from being removed from the bore. A method for coupling a pedal to a vehicle in a tool-less manner is also disclosed.

14 Claims, 12 Drawing Sheets

(56) References Cited

U.S. PATENT DOCUMENTS 7,080,574 B2 * 7/2006 Chang ........................ 74/594.1
7,572,199 B1 * 8/2009 Calendrille, Jr. ............... 474/80
8,408,094 B2 * 4/2013 Chen .......................... 74/594.1

OTHER PUBLICATIONS

International Searching Authority, International Search Report and Written Opinion issued in corresponding International Application No. PCT/US2011/024458 mailed May 3, 2011, 8 pages.

* cited by examiner

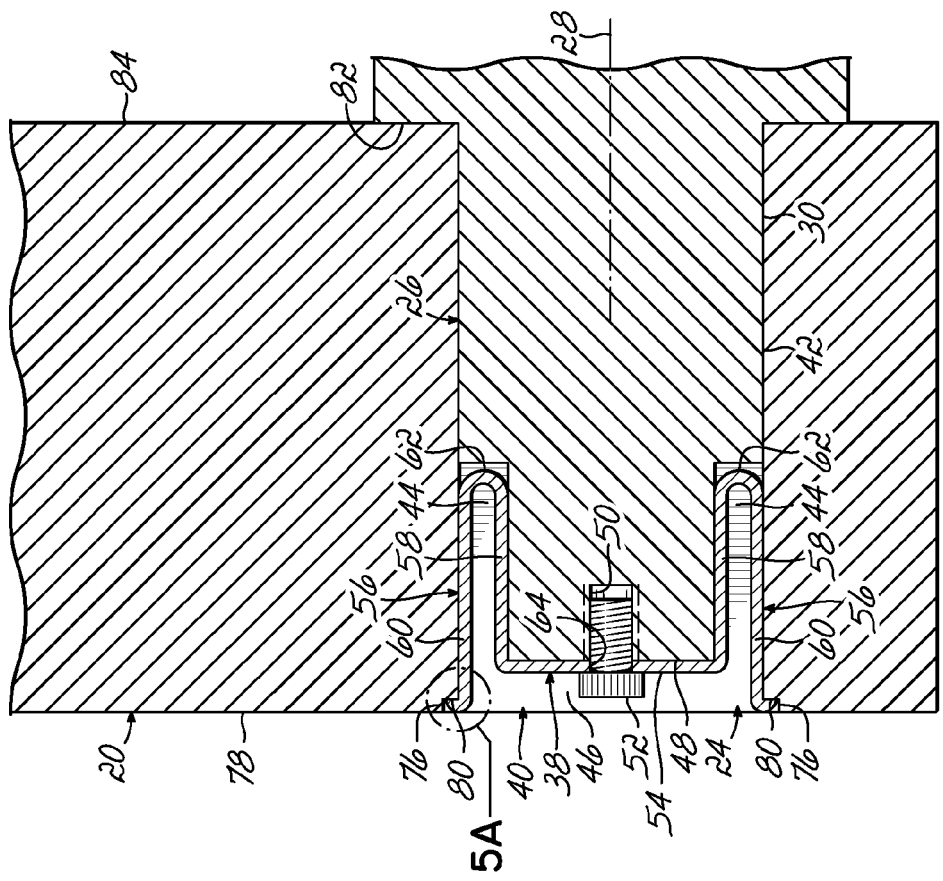
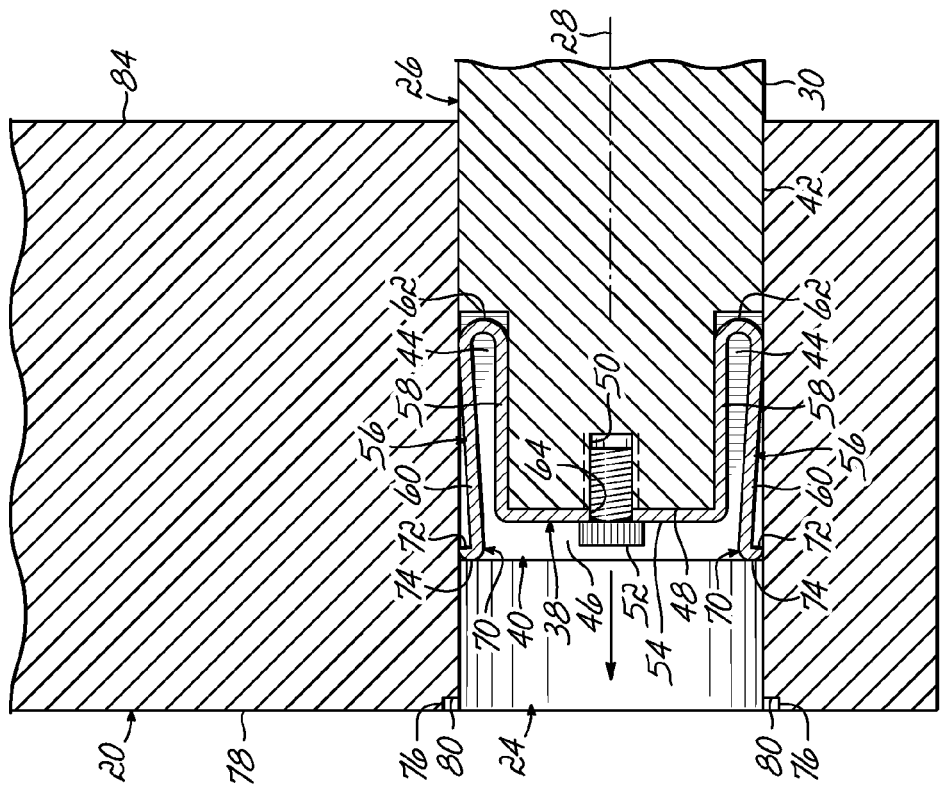
FIG. 5
FIG. 4

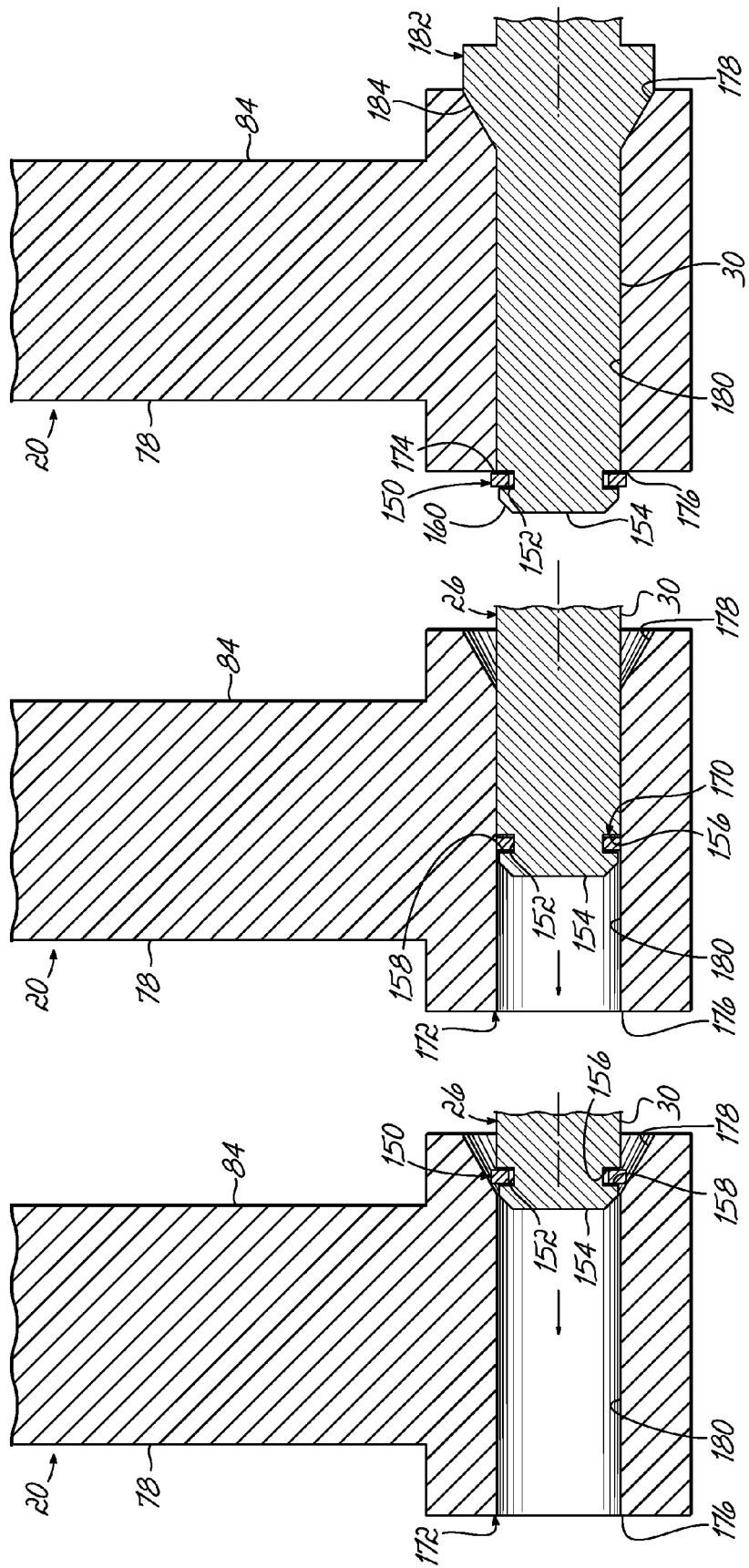

TOOL-LESS PEDAL ASSEMBLY

CROSS REFERENCE TO RELATED APPLICATIONS

This application is a continuation-in-part of International Application No. PCT/US2011/024458, filed Feb. 11, 2011, which claims the benefit of U.S. Provisional Application No. 61/305,741, filed Feb. 18, 2010 and U.S. Provisional Application No. 61/408,873, filed Nov. 1, 2010. Each of these applications is incorporated by reference herein in its entirety.

TECHNICAL FIELD

The invention relates generally to pedaled vehicles, including bicycles, tricycles and the like, and more particularly to the assembly of a pedal to a vehicle in a tool-less manner.

BACKGROUND

Bicycles, tricycles and other pedaled vehicles are some of the most popular items with children and adults alike. Such pedaled vehicles are typically manufactured and shipped to various retail outlets in an unassembled state. Some retail outlets may offer a service of assembling the pedaled vehicle for the customer. However, in many instances, such a service may not be offered or the consumer chooses to forego the service and assemble the pedaled vehicle at home. In any event, conventional assembly of the pedaled vehicle typically requires the retail outlet or the consumer to have various tools for implementing assembly.

By way of example, in many instances, the pedals of the vehicle will have to be coupled to the vehicle during assembly. In this regard, pedals typically have a threaded stem extending from one end of the pedal that is inserted within a correspondingly threaded bore in the arm of the vehicle's crank. The stem may include a non-circular portion (e.g., hexagonal portion) configured to receive a tool, such as a wrench, for tightening the threaded stem within the bore so as to secure the pedal to the crank. When assembly is performed at the retail outlet, such tool-based assembly can be costly and time consuming. Moreover, improper assembly by the retail outlet can be a source of consumer frustration and/or product return. When assembly is performed by the consumer in the home setting, for example, tool-based assembly can be the source of consumer frustration, and may likewise result in product return if the assembly process becomes too complex or daunting.

For these and other reasons, manufacturers of pedaled vehicles have been moving in a direction of tool-less assembly of the vehicles, including, for example, the tool-less assembly of the pedals to the vehicle. In this regard, various quick-connect pedal designs have been proposed. These prior designs are based on quick-connect systems in other industries and generally include a metal, generally cylindrical housing having a passageway formed therethrough and which is received within the bore of the crank arm. A biased occluding member, such as one or more spring-biased ball bearings, extends into the passageway, but is capable of being moved outwardly thereof. The stem of the pedals generally includes a groove or shoulder configured to receive the occluding member therein so as to couple the pedal to the vehicle. The occluding member and groove are configured such that the pedal may be inserted into the passageway of the housing with relatively little force, but requires a considerably larger force to remove the pedal from the housing.

Such quick-connect designs, however, are not without their drawbacks. In this regard, such designs are not completely tool-less. More particularly, the housing is generally coupled to the bore of the crank via a threaded connection that requires tool-based assembly. Additionally, such designs are, in many cases, more complex in that they utilize multiple movable parts and may also increase the costs of the vehicle. For example, to withstand the structural loads, the quick-connect housing is generally made of stainless steel or the like.

Thus, there remains a need for a pedal design which may be coupled to a pedaled vehicle in a tool-less manner and which is relatively simple in its design and cost effective in its manufacturing and implementation.

SUMMARY

A pedaled vehicle in accordance with aspects of the invention include a frame, at least one wheel rotatably coupled to the frame, a crank assembly operatively coupled to the at least one wheel for moving the vehicle and having a bore, a pedal having a shaft configured to be received in the bore in the crank assembly, and a spring clip for securing the pedal to the crank assembly including at least one flexible tab or leg capable of flexing between a first configuration and a second configuration. When the flexible tab or leg is in the first configuration, the pedal shaft is allowed to pass through the bore of the crank assembly, and when the flexible tab or leg is in the second configuration, the pedal shaft is prevented from being removed from the bore of the crank assembly. In this way, the at least one pedal may be coupled to the crank assembly in a tool-less manner. The vehicle may be most any pedaled vehicle including, for example, a unicycle, a bicycle or tricycle.

In one embodiment, the spring clip may be secured to the pedal by a fastener. Alternatively, the spring clip may be secured to the pedal by the at least one tab. Additionally, the at least one flexible tab may be acutely angled with respect to a longitudinal axis of the bore. The angulation of the tabs may facilitate insertion of the pedal shaft, but restrict its movement in the opposite direction. In an exemplary embodiment, the bore may include a first bore portion have a first cross dimension and a second bore portion having a second cross dimension that is larger than the first cross dimension. The at least one flexible tab or leg may be disposed in the second bore portion when in the second configuration. In one embodiment, the second bore portion may be formed by a notch in the crank assembly. The notch may be in the form of an annular ring or discrete notch segments.

In one embodiment, the spring clip may include a U-shaped configuration having a base portion and a pair of flexible legs on opposed ends of the base portion. In another embodiment, the spring clip includes a disc-shaped main body having an outer edge and the at least one flexible tab extends from the outer edge of the main body. In yet another embodiment, the spring clip may include a disc-shaped main body having an inner edge, wherein the at least one flexible tab extends from the inner edge of the main body. In one embodiment, the pedal may include a shaft having a head at an end thereof that is larger than an adjacent portion of the shaft so as to define a shoulder. The at least one flexible tab may engage the shoulder when the pedal is secured to the crank assembly. The head on the shaft may include a chamfered end that cams the at least one tab between its first and second configurations during insertion of the pedal into the bore. In an exemplary embodiment, the spring clip may include a plurality of flexible tabs or legs. Additionally, the spring clip may be entirely positioned within the confines of the crank assembly and additionally or alternatively, the at least one flexible tab may be directed toward a centerline of the bore.

A method of coupling a pedal to a vehicle in a tool-less manner includes flexing a tab or leg of a spring clip to a first configuration so that the spring clip is in a tensioned state; inserting a shaft of the pedal into the bore of the vehicle when the spring clip is in the first configuration; and reducing the tension in the spring clip so that the spring clip moves to a second configuration, the shaft of the pedal inserted into the bore of the vehicle being restricted from moving out of the bore when the spring clip is in the second configuration. In one embodiment, the spring clip may be positioned in the bore prior to inserting the pedal into the bore of the vehicle. Alternatively, the spring clip may be coupled to the pedal prior to inserteing the pedal into the bore of the vehicle. In one embodiment, the pedal may be used to flex the tab or leg to the first configuration. The spring clip may move to the second configuration by providing a recess in the shaft of the pedal. Alternatively, the tension of the spring clip may be reduced by engaging the flexible tab or leg with a notch in the bore of the vehicle.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 4 is a cross-sectional view illustrating assembly of a pedal to a crank in a tool-less manner according to the embodiment shown in FIGS. 2 and 3;

FIG. 5 is another cross-sectional view illustrating assembly of the pedal shown in FIG. 4 to the crank in a tool-less manner;

FIG. 14 is a cross-sectional view illustrating assembly of a pedal to a crank in a tool-less manner according to the embodiment shown in FIG. 13;

FIG. 15 is another cross-sectional view illustrating assembly of the pedal shown in FIG. 13 to the crank in a tool-less manner; and FIG. 16 is another cross-sectional view illustrating assembly of the pedal shown in FIG. 13 to the crank in a tool-less manner.

DETAILED DESCRIPTION

Figure 1:
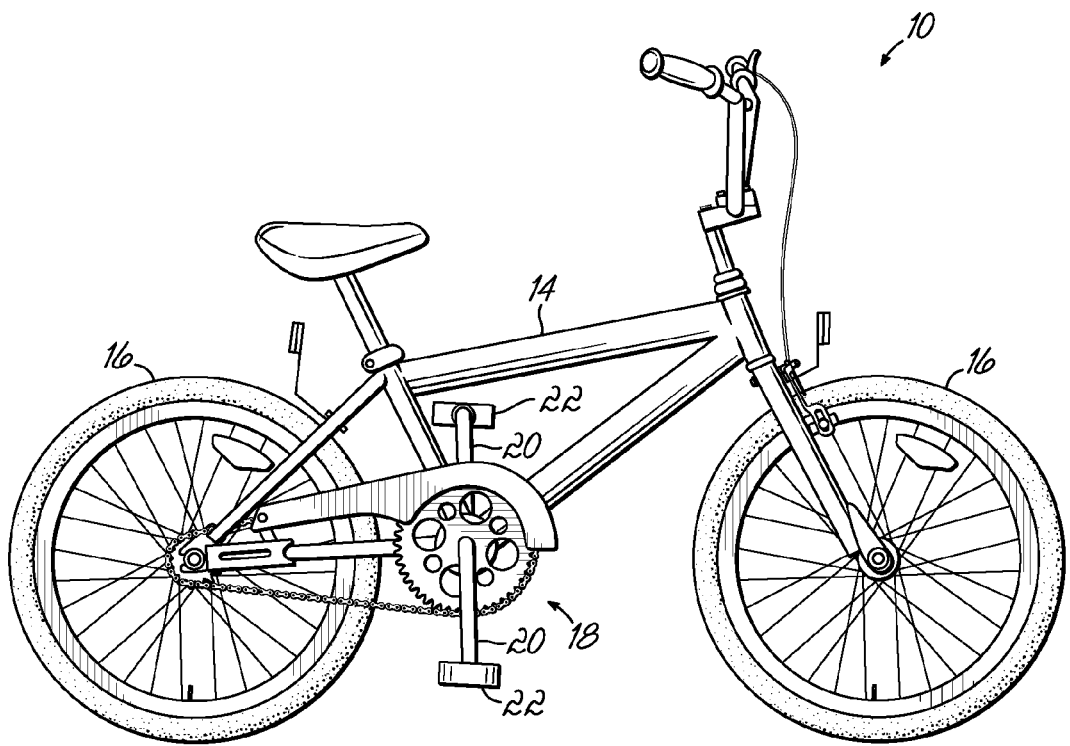
FIG. 1 is a side elevation view of a pedaled vehicle in the form of a bicycle in one embodiment in accordance with aspects of the invention.
Figure 3:
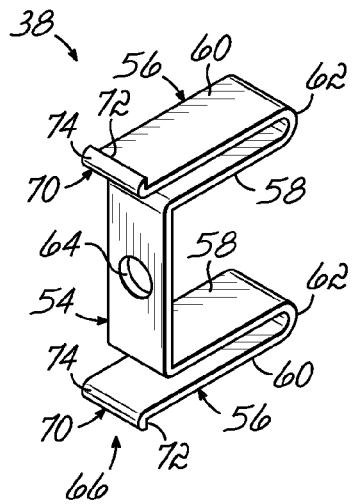
FIG. 3 is a perspective view of a spring clip in one embodiment in accordance with aspects of the invention.

Referring now to the drawings and to FIG. 1 in particular, a pedaled vehicle 10 in the form of a bicycle is shown. While the pedaled vehicle 10 is shown herein as a bicycle, it should be recognized that the pedaled vehicle 10 may include most any pedaled vehicle, including unicycles, tricycles, various children's toys, paddle boats, exercise bikes, and many other one, two, three, four or more wheeled pedaled vehicles. Accordingly, aspects of the invention are not limited to the specific embodiment shown and described herein, but encompass a wide range of pedaled vehicles. The pedaled vehicle 10 includes a frame 14, at least one wheel 16 (two shown), and a crank assembly 18. The crank assembly 18 allows a rider to move the vehicle 10, such as along the ground, for example. The crank assembly 18 includes a pair of opposed crank arms 20 and a pair of pedals 22 coupled to respective crank arms 20 adjacent a distal end thereof. In this regard, the crank arms 20 include a through bore 24 (FIG. 2) configured to receive a pedal 22 therein. The pedals 22 extend outwardly from the crank arms 20 in a generally perpendicular manner and are configured to receive, for example, the feet of the rider so as to rotate the crank assembly 18 and move the vehicle 10.

Figure 2:
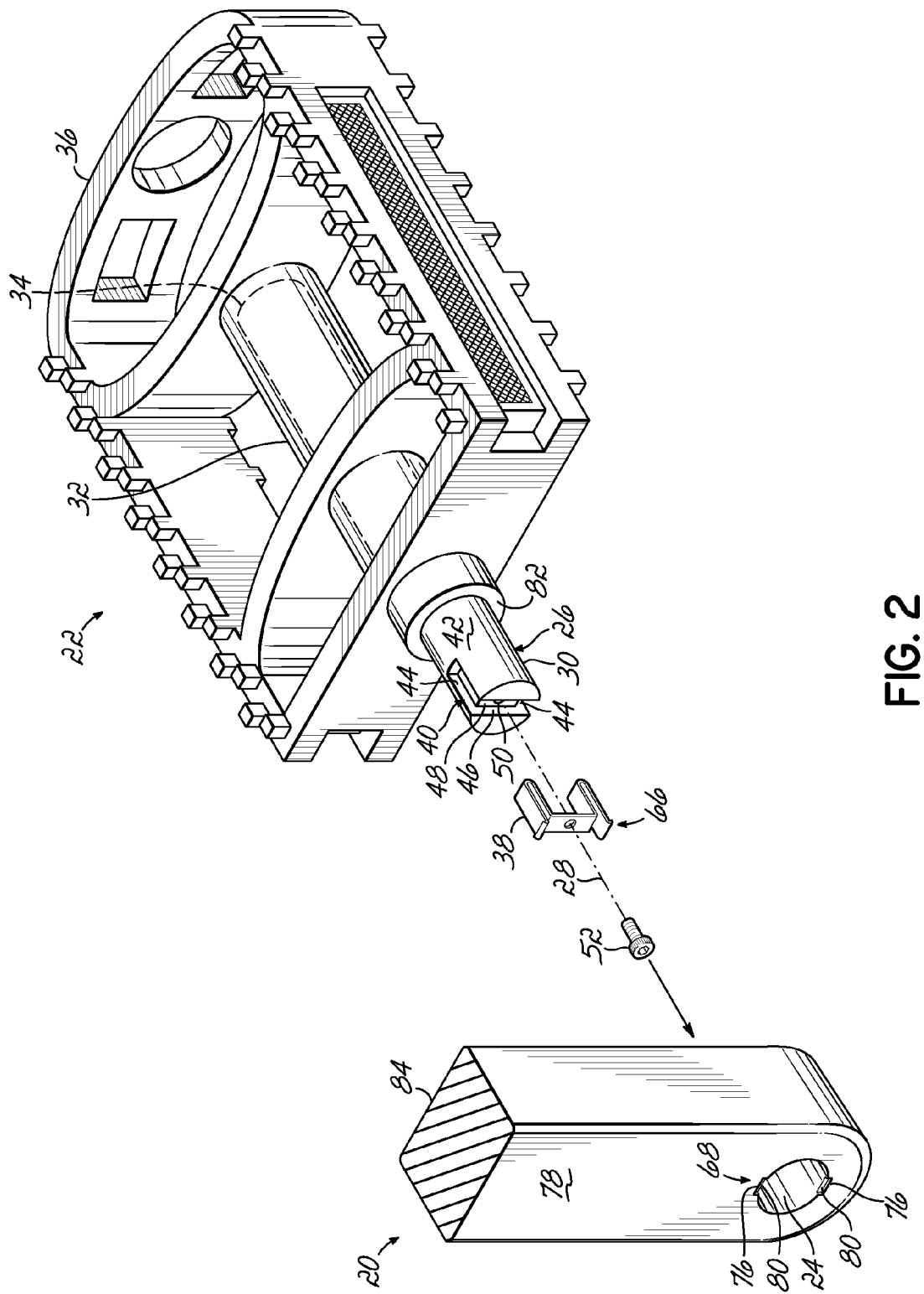
FIG. 2 is a disassembled perspective view of a pedal and crank arm in one embodiment in accordance with aspects of the invention.

As shown in more detail in FIG. 2, each pedal 22 includes a shaft 26 defining a central axis 28 and having a first portion 30 (e.g., stem) configured to be received within the bore 24 of the crank arm 20. The pedal 22 includes a spindle 32 coaxially disposed about a second portion 34 of the shaft 26 and configured to rotate about central axis 28 in both a clockwise and counterclockwise direction. For example, as recognized by those of ordinary skill in the art, the pedal 22 may include suitable bearings, fittings, etc. (not shown) that allow the spindle 32 to rotate relative to the shaft 26. Pedal 22 may further include a pedal body 36 coupled to the spindle 32 and configured to receive the foot or other part of the rider's body for rotating the crank assembly 18. The pedal body 36 may have a wide range of sizes and configurations, but in one embodiment, may include a generally rectangular frame disposed about the spindle 32. Those of ordinary skill in the art will recognize, however, that the invention is not so limited as other shapes and configurations are possible.

In one aspect in accordance with embodiments of the invention, the pedals 22 are configured to be secured to the vehicle 10 in a tool-less manner. As shown in FIGS. 2-5, in one embodiment, the tool-less connection may be made between the pedal 22 and the crank arm 20 utilizing a spring clip, generally shown at 38. In this regard, the first portion 30 of the pedal shaft 26 includes a U-shaped groove 40 formed in the outer surface 42 thereof and configured to receive the spring clip 38 therein. The groove 40 includes a pair of opposed leg portions 44 generally extending in a direction parallel to central axis 28, and a base portion 46 formed in the end surface 48 of shaft 26 and extending between leg portions 44. The base portion 46 may extend in a direction generally perpendicular to central axis 28. A threaded bore 50 may be formed in the base portion 46, such as in a central portion thereof, configured to receive a threaded fastener 52 for securing the spring clip 38 to the pedal 22, as explained in more detail below.

As shown in FIGS. 2-5, the spring clip 38 may have a generally U-shaped configuration that corresponds to the shape of the groove 40 formed in the pedal 22. To this end, the spring clip 38 includes a central base portion 54 and a pair of leg members 56 at opposed ends thereof. Each of the leg members 56 may have a U-shaped configuration as well. In this regard, each leg member 56 includes an inner leg 58, and outer leg 60, and a generally arcuate intermediate leg 62 extending between inner and outer legs 58, 60. The spring clip 38 may be formed from a suitable material, including various metals or plastics configured to withstand the loads imposed thereon. For example, the spring clip 38 may be formed from a suitable metal including, without limitation, hardened steel, tempered steel, or spring steel. Other materials may also be possible.

The U-shaped configuration of the leg members 56 (as well as possibly the material selection and/or dimensions of the spring clip) provides a spring-like behavior to spring clip 38. In this regard, the outer leg 60 is configured to be spaced from the inner leg 58 to allow the outer leg 60 to flex inwardly. Additionally, the intermediate leg 62 (and/or perhaps the inner leg 58) may be configured to bias the outer leg 60 away from the inner leg 58. Thus, the spring clip 38, and more particularly, the outer leg 60 thereof operates as a spring being capable of flexing inwardly toward the inner leg 58, but being resiliently biased outwardly away from the inner leg 58. The base portion 54 of the spring clip 38 includes an aperture 64 configured to be aligned with the bore 50 in the base portion 46 of the groove 40 in pedal 22 such that threaded fastener 52 may be used to secure the spring clip 38 to the pedal 22.

As shown in FIGS. 4 and 5, when the spring clip 38 is coupled to the pedal 22, the base portion 54 of the spring clip 38 is adjacent to and generally overlies the base portion 46 of the groove 40. Additionally, the leg members 56 of spring clip 38 generally extend along the leg portions 44 of groove 40. For reasons that will be described below, the outer leg 60 of the spring clip 38 is biased such that at least a portion thereof (e.g., the free end portion of outer leg 60) extends outwardly of the outer surface 42 of the first portion 30 of shaft 26.

To facilitate a tool-less coupling between the pedal 22 and the crank arm 20 of the crank assembly 18, the pedal 22 may include a first locking element 66 (FIG. 3) and the crank arm 20 may include a second locking element 68 (FIG. 2) that cooperate in a manner that secures the pedal 22 to the crank arm 20 in a tool-less manner. In one embodiment, the first locking member 66 may include a latch 70 formed at the free end of one or both of the outer legs 60 of spring clip 38. The latch 70 defines a generally planar first bearing surface 72 configured to engage a portion of the crank arm 20 when the pedal 22 is coupled thereto. At least a portion of the first bearing surface 72 is configured to extend outwardly of the outer surface 42 of the first portion 30 of shaft 26. The latch 70 may further include a cam surface 74, the purpose of which will be described below.

Figure 6:
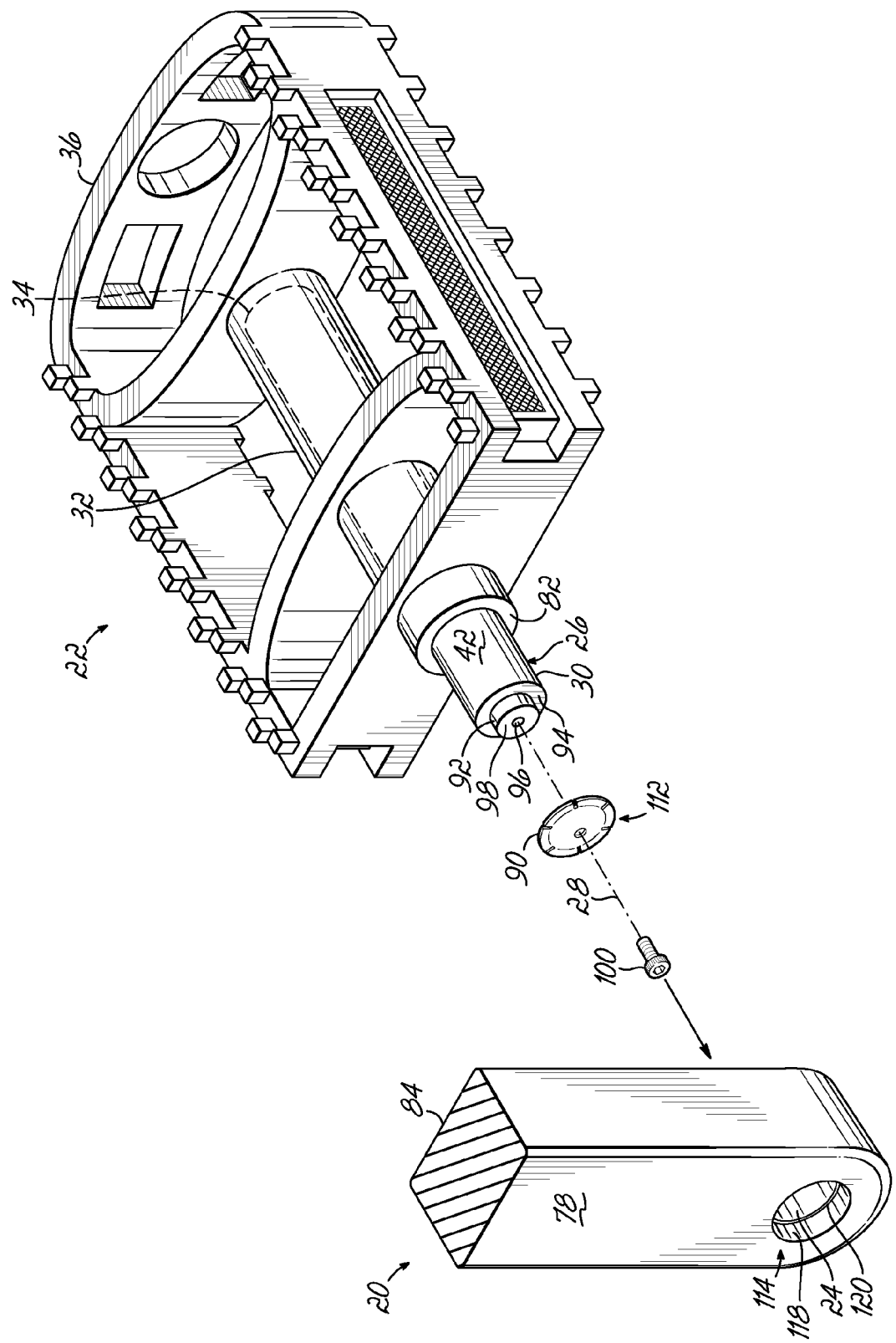
FIG. 6 is a disassembled perspective view of a pedal and crank arm in another embodiment in accordance with aspects of the invention.

In the exemplary embodiment, the second locking element 68 may include at least one notch 76 formed in the inner surface 78 of crank arm 20 adjacent bore 24. The effect of the at least one notch 76 is to define a first bore portion having a first cross dimension and a second bore portion, formed by the at least one notch 76, having a second cross dimension greater than the first cross dimension. The number of notches 76 may correspond to the number of latches 70 on the spring clip 38 (e.g., two latches and two notches). In this case, the notches 76 may be discrete notches that have a limited circumferential extent about bore 24. In an alternative embodiment, however, the notch 76 may include an annular ring extending substantially the full circumference of bore 24 (e.g., see FIG. 6). In any event, the notch 76 includes a generally planar second bearing surface 80 configured to engage a portion of the pedal 22 when the pedal is coupled to the crank arm 20. For purposes described in more detail below, the second bearing surface 80 is positioned below the inner surface 78 of the crank arm 20 so as to be inset therefrom.

The tool-less assembly of the pedal 22 to the crank arm 20 of the pedaled vehicle 10 will now be described. In an exemplary embodiment, the spring clip 38 may be pre-assembled to the pedal 22 prior to delivery of the pedaled vehicle 10 to a retail outlet, for example. In this regard, the spring clip 38 may be coupled to the pedal 22 using threaded fastener 52 in the manner described above. The pedal 22 is then coupled to the crank arm 20 by inserting the first portion 30 of the shaft 26 into the bore 24 of the crank arm 20. The bore 24 has an inner cross dimension slightly greater than the outer cross dimension of the first portion 30 of the shaft 26. For example, in one embodiment, the inner diameter of bore 24 may be slightly greater than the outer diameter of the first portion 30 of shaft 26. The invention, however, is not limited to circular cross dimensions as other cross-sectional shapes may be utilized in accordance with aspects of the invention.

In this regard, in one embodiment, the first portion 30 of shaft 26 and the bore 24 in crank arm 20 may have corresponding non-circular cross-sectional shapes, including, for example, triangular, square, rectangular, hexagonal, octagonal, etc. The non-circular cross section of the first portion 30 and bore 24 prevents relative rotation between the shaft 26 and the crank arm 20. In addition to the above, the non-circular cross-sectional shape reduces the loads (e.g., torque) that may be imposed on the spring clip 38. For example, with circular cross-sectional shapes, the spring clip 38 would have to resist loads in both a longitudinal direction (e.g., pulling the pedal 22 away from the bore 24) and a circumferential direction (e.g., rotating shaft 26 relative to the bore 24). With the first portion 30 of shaft 26 and bore 24 having non-circular cross sections, any circumferential loading is accommodated by the shaft 26 and crank arm 20, and not by the spring clip 38. Accordingly, the spring clip 38 may remain more reliable during the useful life of the pedal 22.

As discussed above and as illustrated in FIG. 4, at least a portion of the outer leg 60 projects outwardly of the outer surface 42 of the first portion 30 such that at least a portion of the outer leg 60 engages the wall of bore 24 when the pedal 22 is being coupled to the crank arm 20. Due to the features of the spring clip 38, however, the outer leg 60 is able to flex inwardly so as to allow the first portion 30 of shaft 26 to pass through the bore 24. In this regard, the cam surface 74 of latch 70 may be generally arcuate to facilitate flexing of the outer leg 60 inwardly as a result of engagement with the wall of bore 24. As the pedal 22 is being pushed toward the crank arm 20, the latch 70 slides along the wall of bore 24 in a frictional, but movable manner.

As best illustrated in FIGS. 4 and 5, when the pedal 22 nears its fully seated position relative to crank arm 20, the latch 70 encounters the notch 76 such that the outer leg 60 of the spring clip 38 snaps outwardly so as to be positioned within notch 76. When so positioned, the first bearing surface 72 of the latch 70 is in confronting relationship with the second bearing surface 80 of the notch 76. In one embodiment, the bearing surfaces 72, 80 may engage each other. In another embodiment, the bearing surfaces 72, 80 may be slightly spaced from one another (not shown).

In any event, when the latch(es) 70 snap fit into the notch(es) 76, the pedal 22 is secured to the crank arm 20. In this regard, if the pedal 22 is pushed inwardly (i.e., toward crank arm 20), a shoulder 82 formed on the first portion 30 of shaft 26 is configured to engage the outer surface 84 of the crank arm 20 so as to prevent or limit any substantial inward movement of the pedal 22. In a similar manner, if the pedal 22 is pulled outwardly (i.e., away from crank arm 20), the bearing surfaces 72, 80 engage each other so as to prevent or limit any substantial outward movement of the pedal 22. Thus, the pedal 22 is securely coupled to the crank arm 20.

Figure 5A:
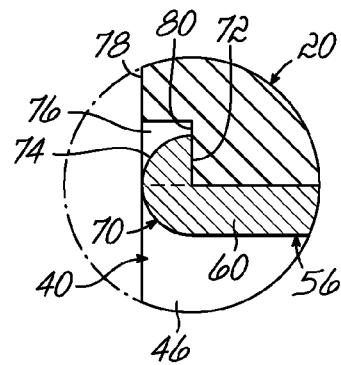
FIG. 5A is an enlarged view of the coupling between the spring clip and the crank shown in FIG. 5.

When the pedal 22 is fully seated within the bore 24 of the crank arm 20, no portion of the spring clip 38 may extend above the inner surface 78 of the crank arm 20. More particularly, and as shown in FIGS. 5 and 5A, the inner most portion of the latches 70 (as well as the remainder of the spring clip 38) lie along or below a plane generally defined by the inner surface 78 of the crank arm 20. In this way, any unintentional disengagement of the locking elements that secure the pedal 22 to the vehicle 10 may be reduced or avoided. For example, with such a configuration, the spring clip 38 cannot be unintentionally snagged by clothing, brush, etc. so as to loosen the securement of the pedal 22 to the crank arm 20. If a rider desires to remove the pedals 22 from the pedaled vehicle 10, such as to insert new or different pedals, the threaded fastener 52 that holds the spring clip 38 to the pedal 22 may be removed. The spring clip 38 may then be removed from the bore 24 via the opening in the inner surface 78 and the pedal 22 may then be pulled outwardly to remove the pedal 22 (minus the spring clip 38) from the bore 24.

In accordance with an aspect of the invention, the coupling of the pedal 22 to the crank arm 20 may be achieved in a tool-less manner. In this regard, the amount of force that it takes to push the first portion 30 of the shaft 26 into bore 24 in crank arm 20 is configured to be within the capacity of an adult person using his or her hands. Based on the above description, it should be appreciated that the coupling of the pedal 22 to the vehicle 10 is therefore quick, relatively easy to understand and implement, and achieved without the need of any tools. Additionally, the mechanism(s) that provide for the tool-less assembly are relatively simple in their design and cost-effective in regard to manufacturing and implementation.

Another embodiment in accordance with the invention is shown in FIGS. 6-9, in which like reference numerals refer to like features in FIGS. 1-5. Similar to the previous embodiment, the tool-less coupling may be made between the pedal 22 and the crank arm 20 utilizing a spring clip, generally shown at 90, which has a different design as compared to spring clip 38. In this regard, the first portion 30 of the pedal shaft 26 includes a raised boss 92 defined by an annular groove or cutout 94 formed along the periphery of the shaft 26 and adjacent an end thereof. A threaded bore 96 may be formed in the end surface 98 of the raised boss 92, such as in a central portion thereof, configured to receive a threaded fastener 100 for securing the spring clip 90 to the pedal 22, as explained in more detail below.

Figure 7:
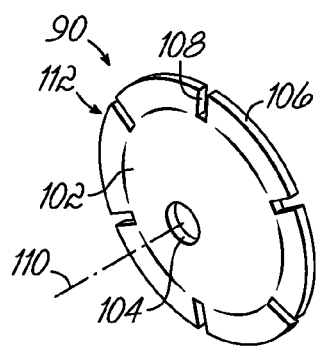
FIG. 7 is a perspective view of a spring clip in another embodiment in accordance with aspects of the invention.

As shown in FIG. 7, in one embodiment the spring clip 90 may be generally disc shaped having a main body 102 that may be generally circular in shape. While the main body 102 of spring clip 90 is shown and described as having a generally circular shape, it will be appreciated that the main body 102 of spring clip 90 may have other shapes and still be within the scope of the invention. Additionally, the main body 102 may not be generally planar, but instead have a generally parabolic cross-sectional profile, as show in FIGS. 8 and 9. The main body 102 defines a central region including a central aperture 104 configured to receive the threaded fastener 100 therethrough, and an outer edge region including at least one tab 106. By way of example and without limitation, in one embodiment, one or more slots 108 may be formed in the outer edge of the main body 102 so as to define a plurality of tabs 106. The spring clip 90 may be formed from a suitable material, including various metals or plastics configured to withstand the loads imposed thereon. For example, the spring clip 90 may be formed from a suitable metal including, without limitation, hardened steel, tempered steel, or spring steel. Other materials may also be possible.

The configuration of the main body 102 (as well as possibly the material selection and/or dimensions of the spring clip) provides a spring-like behavior to spring clip 90. In this regard, the formation of slots 108 allows the tabs 106 to have some level of flexibility, i.e., the tabs 106 are capable of flexing relative to the remainder of the main body 102. In addition, the generally parabolic configuration of the main body 102 encourages flexing of the tabs 106 generally inwardly toward its central axis 110 but discourages flexing of the tabs 106 generally outwardly away from its central axis 110. In other words, the force that it takes to flex the tabs 106 generally inwardly may be configured to be less than, and perhaps significantly less than, the force that it takes to flex the tabs 106 generally outwardly. Moreover, the force that it takes to flex the tabs 106 outwardly may be relatively large. Thus, the spring clip 90, and more particularly, the tabs 106 thereof operate as a spring capable of flexing and resilient biasing similar to the previous embodiment.

Figure 9:
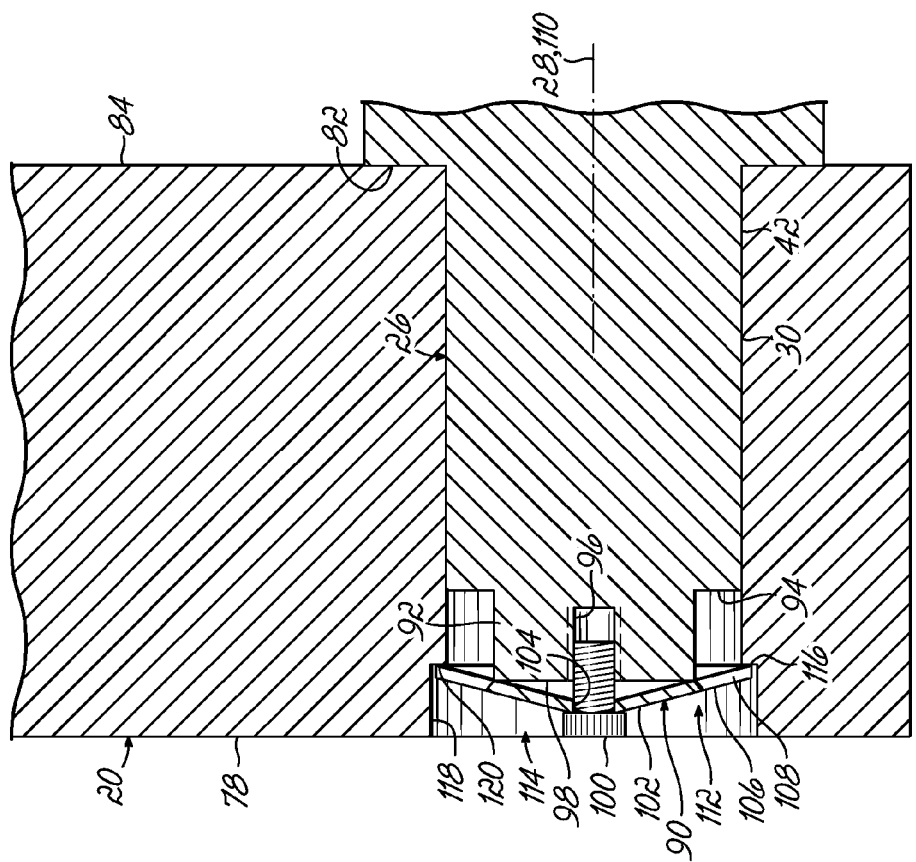
FIG. 9 is another cross-sectional view illustrating assembly of the pedal shown in FIG. 8 to the crank in a tool-less manner.
Figure 8:
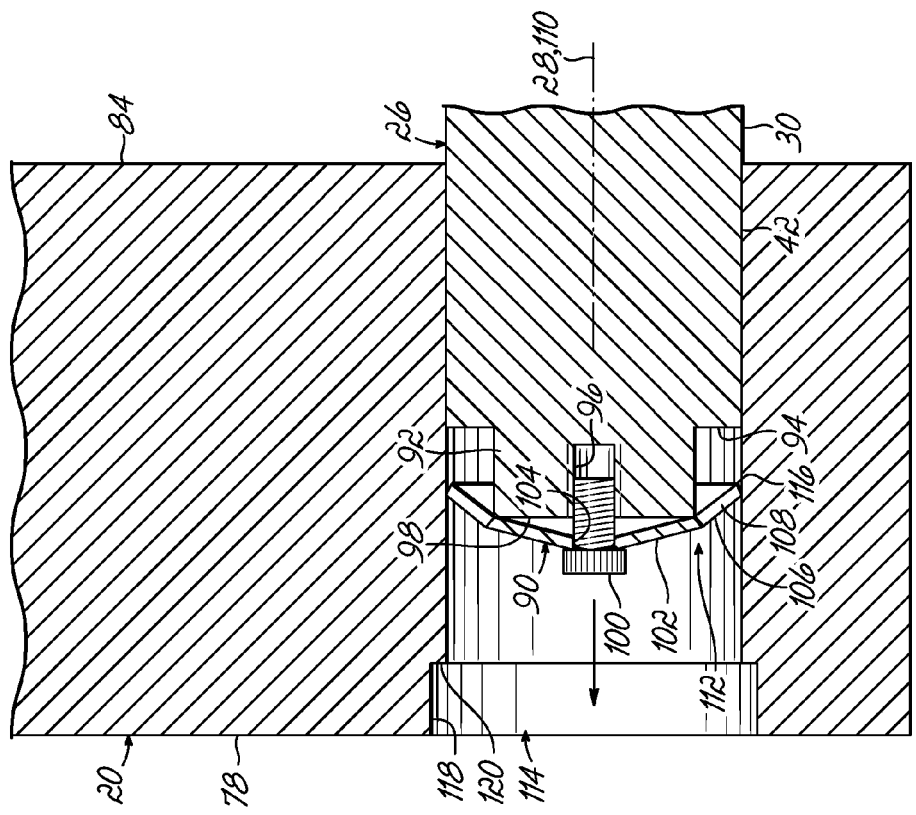
FIG. 8 is a cross-sectional view illustrating assembly of a pedal to a crank in a tool-less manner according to the embodiment shown in FIGS. 6 and 7.

As shown in FIGS. 8 and 9, when the spring clip 90 is coupled to the pedal 22, the central portion of the spring clip 90 is adjacent to and generally overlies the end surface 98 of the raised boss 92. Additionally, the spring clip 90 is sized such that the outer edge region of main body 102 extends outwardly of the raised boss 92. More particularly, and for reasons that will be described below, the spring clip 90 is configured such that at least a portion thereof extends outwardly of the outer surface 42 of the first portion 30 of shaft 26. By way of example, at least a portion of tabs 106 may extend outwardly of the outer surface 42 of the first portion 30 of shaft 26.

To facilitate a tool-less coupling between the pedal 22 and the crank arm 20 of the crank assembly 18, the pedal 22 may include a first locking element 112 (FIG. 7) and the crank arm 20 may include a second locking element 114 (FIG. 6) that cooperate in a manner that secures the pedal 22 to the crank arm 20 in a tool-less manner. In one embodiment, the first locking element 112 may include one or more of the tabs 106 formed along the outer edge region of the spring clip 90. The tabs 106 define a first bearing surface 116 configured to engage a portion of the crank arm 20 when the pedal 22 is coupled thereto. As noted above, at least a portion of the first bearing surface 116 is configured to extend outwardly of the outer surface 42 of the first portion 30 of shaft 26.

In this exemplary embodiment, the second locking element 114 may include at least one notch 118 formed in the inner surface 78 of crank arm 20 adjacent bore 24. The notch 118 may be configured as an annular ring extending substantially the full circumference of bore 24. The effect of the at least one notch 118 is to define a first bore portion having a first cross dimension and a second bore portion, formed by the at least one notch 118, having a second cross dimension greater than the first cross dimension. The notch 118 includes a second bearing surface 120 configured to engage a portion of the pedal 22 when the pedal is coupled to the crank arm 20. For purposes described in more detail below, the second bearing surface 120 is positioned below the inner surface 78 of the crank arm 20 so as to be inset therefrom.

The tool-less assembly of the pedal 22 and the crank arm 20 of the pedaled vehicle 10 will now be described for the present embodiment. In an exemplary embodiment, the spring clip 90 may be pre-assembled to the pedal 22 prior to delivery of the pedaled vehicle 10 to a retail outlet. In this regard, the spring clip 90 may be coupled to the pedal 22 using threaded fastener 100 in the manner described above. The pedal 22 is then coupled to the crank arm 20 by inserting the first portion 30 of the shaft 26 into the bore 24 of the crank arm 20. The bore 24 has an inner cross dimension slightly greater than the outer cross dimension of the first portion 30 of the shaft 26. For example, in one embodiment, the inner diameter of bore 24 may be slightly greater than the outer diameter of the first portion 30 of shaft 26. The invention, however, is not limited to circular cross dimensions as other cross-sectional shapes may be utilized in accordance with aspects of the invention.

As discussed above and as illustrated in FIG. 8, at least a portion of the tabs 106 projects outwardly of the outer surface 42 of the first portion 30 such that at least a portion of the tabs 106 engages the wall of bore 24 when the pedal 22 is being coupled to the crank arm 20. Due to the features of the spring clip 90, however, the tabs 106 are able to flex inwardly so as to allow the first portion 30 of shaft 26 to pass through the bore 24. In this regard, and as noted above, the generally parabolic profile of main body 102 facilitates flexing of the tabs 106 inwardly as a result of engagement with the wall of bore 24. Additionally, the annular cutout 94 disposed about raised boss 92 provides an opening or gap that allows the tabs 106 sufficient space to flex inwardly. As the pedal 22 is being pushed toward the crank arm 20, the tabs 106 slide along the wall of bore 24 in a frictional, but movable manner.

As best illustrated in FIGS. 8 and 9, when the pedal 22 nears its fully seated position relative to crank arm 20, the tabs 106, which are flexed inwardly as they traverse bore 24, encounter the annular notch 118 such that the tabs 106 of the spring clip 90 snap outwardly so as to be positioned within notch 118. When so positioned, the first bearing surface 116 of the tabs 106 is in confronting relationship with the second bearing surface 120 of the notch 118. In one embodiment, the bearing surfaces 116, 120 may engage each other. In another embodiment, the bearing surfaces 116, 120 may be slightly spaced from one another (not shown).

In any event, when the tabs 106 snap fit into the notch 118, the pedal 22 is secured to the crank arm 20. In this regard, if the pedal 22 is pushed inwardly (i.e., toward crank arm 20), a shoulder 82 formed on the first portion 30 of shaft 26 is configured to engage the outer surface 84 of the crank arm 20 so as to prevent or limit any substantial inward movement of the pedal 22. In a similar manner, if the pedal 22 is pulled outwardly (i.e., away from crank arm 20), the bearing surfaces 116, 120 engage each other so as to prevent or limit any substantial outward movement of the pedal 22. Thus, the pedal 22 is securely coupled to the crank arm 20.

When the pedal 22 is fully seated within the bore 24 of the crank arm 20, no portion of the spring clip 90 may extend above the inner surface 78 of the crank arm 20. More particularly, and as shown in FIG. 9, the central region of the main body 102 (as well as the remainder of the spring clip 90) lies along or below a plane generally defined by the inner surface 78 of the crank arm 20. In this way, any unintentional disengagement of the locking elements that secure the pedal 22 to the vehicle 10 may be reduced or avoided. For example, with such a configuration, the spring clip 90 cannot be unintentionally snagged by clothing, brush, etc. so as to loosen the securement of the pedal 22 to the crank arm 20. If a rider desires to remove the pedals 22 from the pedaled vehicle 10, such as to insert new or different pedals, the threaded fastener 100 that holds the spring clip 90 to the pedal 22 may be removed. The spring clip 90 may then be removed from the bore 24 via the opening in the inner surface 78 and the pedal 22 may then be pulled outwardly to remove the pedal 22 (minus the spring clip 90) from the bore 24.

In accordance with an aspect of the invention, the coupling of the pedal 22 to the crank arm 20 in this embodiment may be achieved in a tool-less manner. In this regard, the amount of force that it takes to push the first portion 30 of the shaft 26 into bore 24 in crank arm 20 is configured to be within the capacity of an adult person using his or her hands. Based on the above description, it should be appreciated that the coupling of the pedal 22 to the vehicle 10 is therefore quick, relatively easy to understand and implement, and achieved without the need of any tools. Additionally, the mechanisms that provide for the tool-less assembly are relatively simple in their design and cost-effective in regard to manufacturing and implementation.

Figure 10:
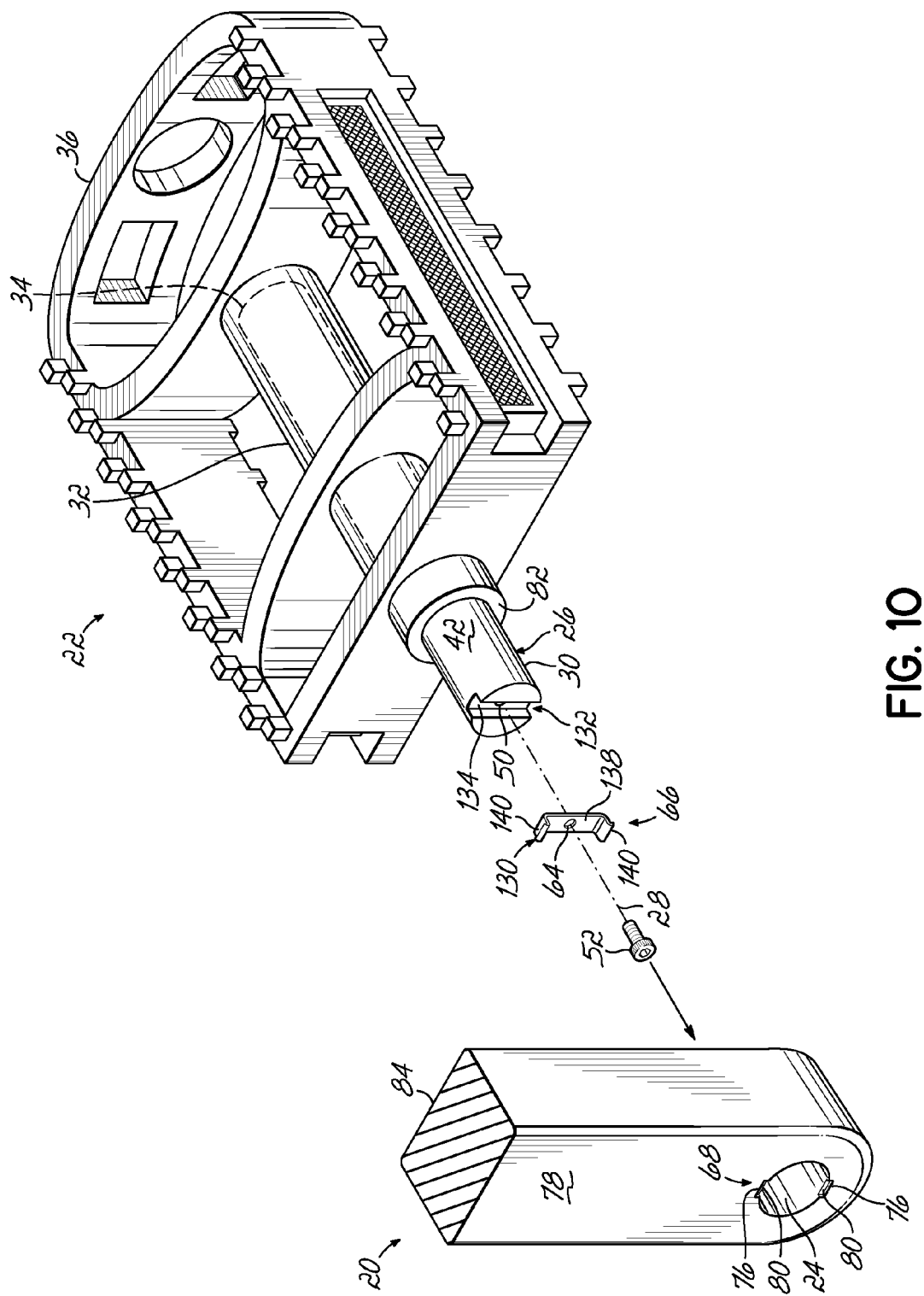
FIG. 10 is a disassembled perspective view of a pedal and crank arm in another embodiment in accordance with aspects of the invention.
Figure 11:
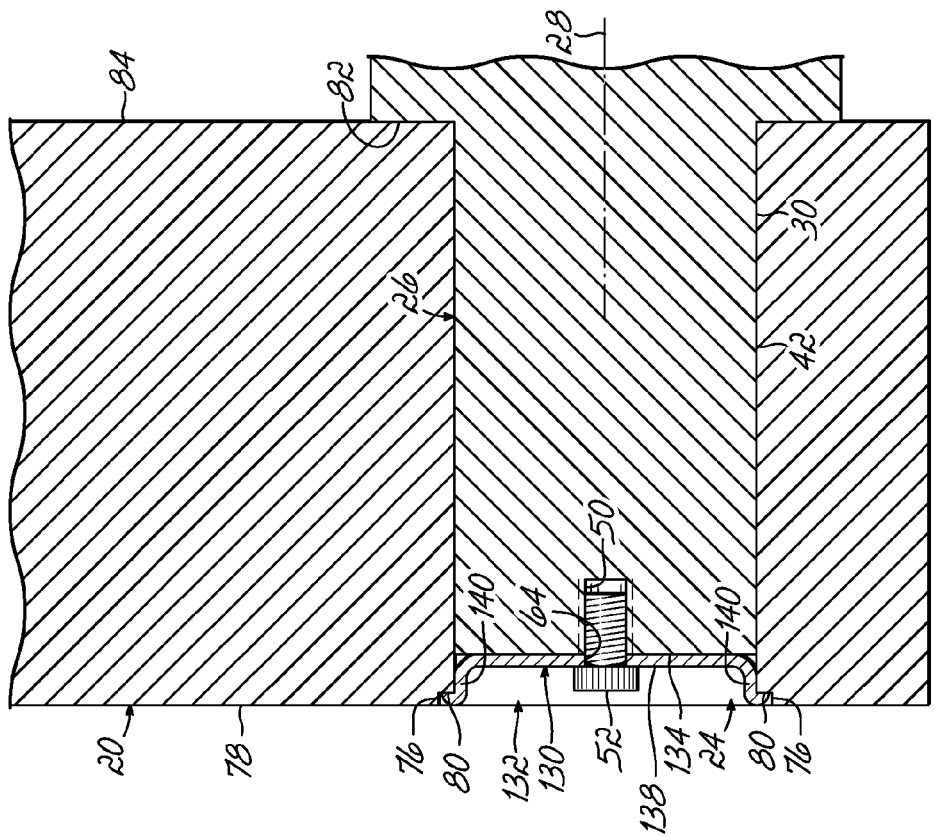
FIG. 11 is a cross-sectional view illustrating assembly of a pedal to a crank in a tool-less manner according to the embodiment shown in FIG. 10.
Figure 12:
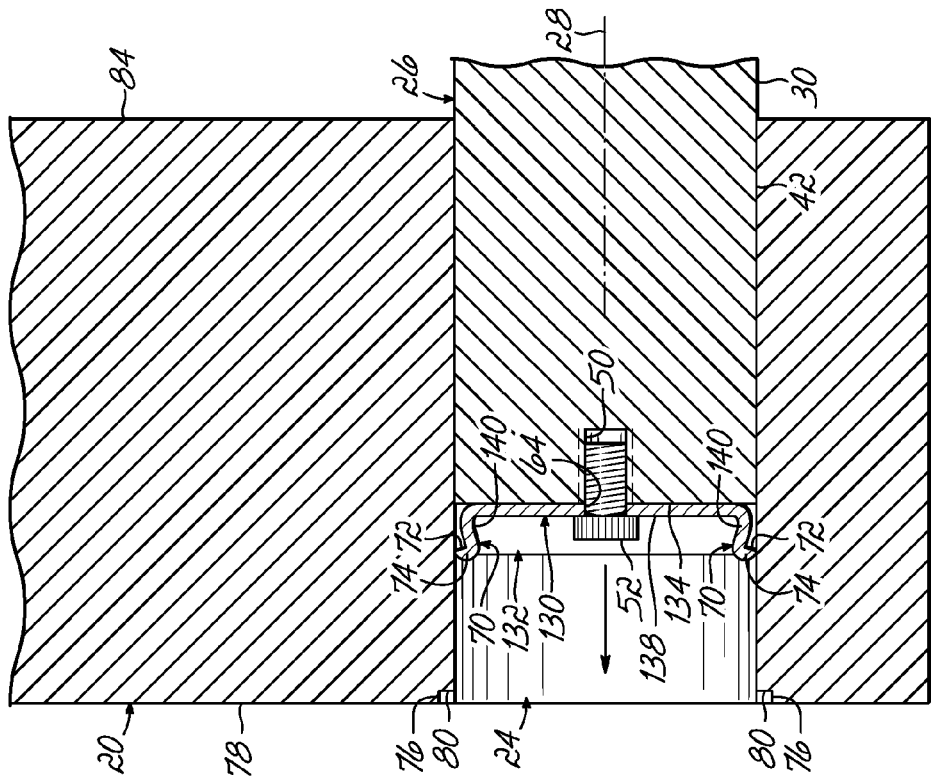
FIG. 12 is another cross-sectional view illustrating assembly of the pedal shown in FIG. 10 to the crank in a tool-less manner.

A further embodiment of a tool-less coupling between a pedal 22 and a crank arm 20 utilizing a spring clip, generally shown at 130, is shown in FIGS. 10-12. This embodiment of spring clip 130 is similar to spring clip 38 and like reference numerals will refer to like features in FIGS. 2-5. As shown in FIG. 10, the first portion 30 of the pedal shaft 26 includes a groove 132 formed in the outer surface 42 thereof and configured to receive the spring clip 130 therein. The groove 132 includes a base portion 134 formed in the end surface 48 of shaft 26. The base portion 134 may extend in a direction generally perpendicular to central axis 28. A threaded bore 50 may be formed in the base portion 134, such as in a central portion thereof, configured to receive a threaded fastener 52 for securing the spring clip 130 to the pedal 22, as explained in more detail below.

As shown in FIG. 10, the spring clip 130 includes a central base portion 138 and a pair of leg members 140 at opposed ends thereof. Unlike spring clip 38, however, the leg members 140 do not have a U-shaped configuration, but project directly outwardly from base portion 138. The spring clip 130 may be formed from a suitable material, including various metals or plastics configured to withstand the loads imposed thereon. For example, the spring clip 130 may be formed from a suitable metal including, without limitation, hardened steel, tempered steel, or spring steel. Other materials may also be possible.

The leg members 140 provide a spring-like behavior to spring clip 130. In this regard, the leg members 140 are configured to flex inwardly against a bias that tends to separate the leg members 140 from each other. Thus, the spring clip 130, and more particularly, the leg members 140 thereof operate as a spring being capable of flexing inwardly toward each other, but being resiliently biased outwardly away from each other. The base portion 138 of the spring clip 130 includes an aperture 64 configured to be aligned with the bore 50 in the base portion 138 of the groove 132 in pedal 22 such that threaded fastener 52 may be used to secure the spring clip 130 to the pedal 22. As shown in FIGS. 11 and 12, when the spring clip 130 is coupled to the pedal 22, the base portion 138 of the spring clip 130 is adjacent to and generally overlies the base portion 134 of the groove 132. Similar to above, the leg members 140 of the spring clip 130 are biased such that at least a portion thereof (e.g., the free end portion thereof) extends outwardly of the outer surface 42 of the first portion 30 of shaft 26.

To facilitate a tool-less coupling between the pedal 22 and the crank arm 20 of the crank assembly 18, the pedal 22 may include a first locking element 66 and the crank arm 20 may include a second locking element 68 that cooperate in a manner that secures the pedal 22 to the crank arm 20 in a tool-less manner. In one embodiment, the first locking member 66 may include a latch 70 formed at the free end of one or both of the leg members 140 of spring clip 130. The latch 70 is similar to that described above and a further description will not be provided herein. The second locking element 68 may include at least one notch 76 formed in the inner surface 78 of crank arm 20 adjacent bore 24. The at least one notch 76 in crank arm 20 is similar to that described above and a further description will not be provided herein.

The tool-less assembly of the pedal 22 to the crank arm 20 of the pedaled vehicle 10 will now be described. In an exemplary embodiment, the spring clip 130 may be pre-assembled to the pedal 22 prior to delivery of the pedaled vehicle 10 to a retail outlet, for example. In this regard, the spring clip 130 may be coupled to the pedal 22 using threaded fastener 52 in the manner described above. The pedal 22 is then coupled to the crank arm 20 by inserting the first portion 30 of the shaft 26 into the bore 24 of the crank arm 20. At least a portion of the leg members 140 projects outwardly of the outer surface 42 of the first portion 30 such that at least a portion of the leg members 140 engage the wall of bore 24 when the pedal 22 is being coupled to the crank arm 20. Due to the features of the spring clip 130, however, the leg members 140 are able to flex inwardly so as to allow the first portion 30 of shaft 26 to pass through the bore 24. In this regard, the cam surface 74 of latch 70 may be generally arcuate to facilitate flexing of the leg members 140 inwardly as a result of engagement with the wall of bore 24. As the pedal 22 is being pushed toward the crank arm 20, the latch 70 slides along the wall of bore 24 in a frictional, but movable manner.

As best illustrated in FIGS. 11 and 12, when the pedal 22 nears its fully seated position relative to crank arm 20, the latch 70 encounters the notch 76 such that the leg members 140 of the spring clip 130 snap outwardly so as to be positioned within notch 76. When so positioned, the first bearing surface 72 of the latch 70 is in confronting relationship with the second bearing surface 80 of the notch 76. In one embodiment, the bearing surfaces 72, 80 may engage each other. In another embodiment, the bearing surfaces 72, 80 may be slightly spaced from one another (not shown). In any event, when the latch(es) 70 snap fit into the notch(es) 76, the pedal 22 is secured to the crank arm 20.

Additionally, when the pedal 22 is fully seated within the bore 24 of the crank arm 20, no portion of the spring clip 130 may extend above the inner surface 78 of the crank arm 20. In this way, any unintentional disengagement of the locking elements that secure the pedal 22 to the vehicle 10 may be reduced or avoided. If a rider desires to remove the pedals 22 from the pedaled vehicle 10, such as to insert new or different pedals, the threaded fastener 52 that holds the spring clip 130 to the pedal 22 may be removed. The spring clip 130 may then be removed from the bore 24 via the opening in the inner surface 78 and the pedal 22 may then be pulled outwardly to remove the pedal 22 (minus the spring clip 130) from the bore 24.

Figure 13:
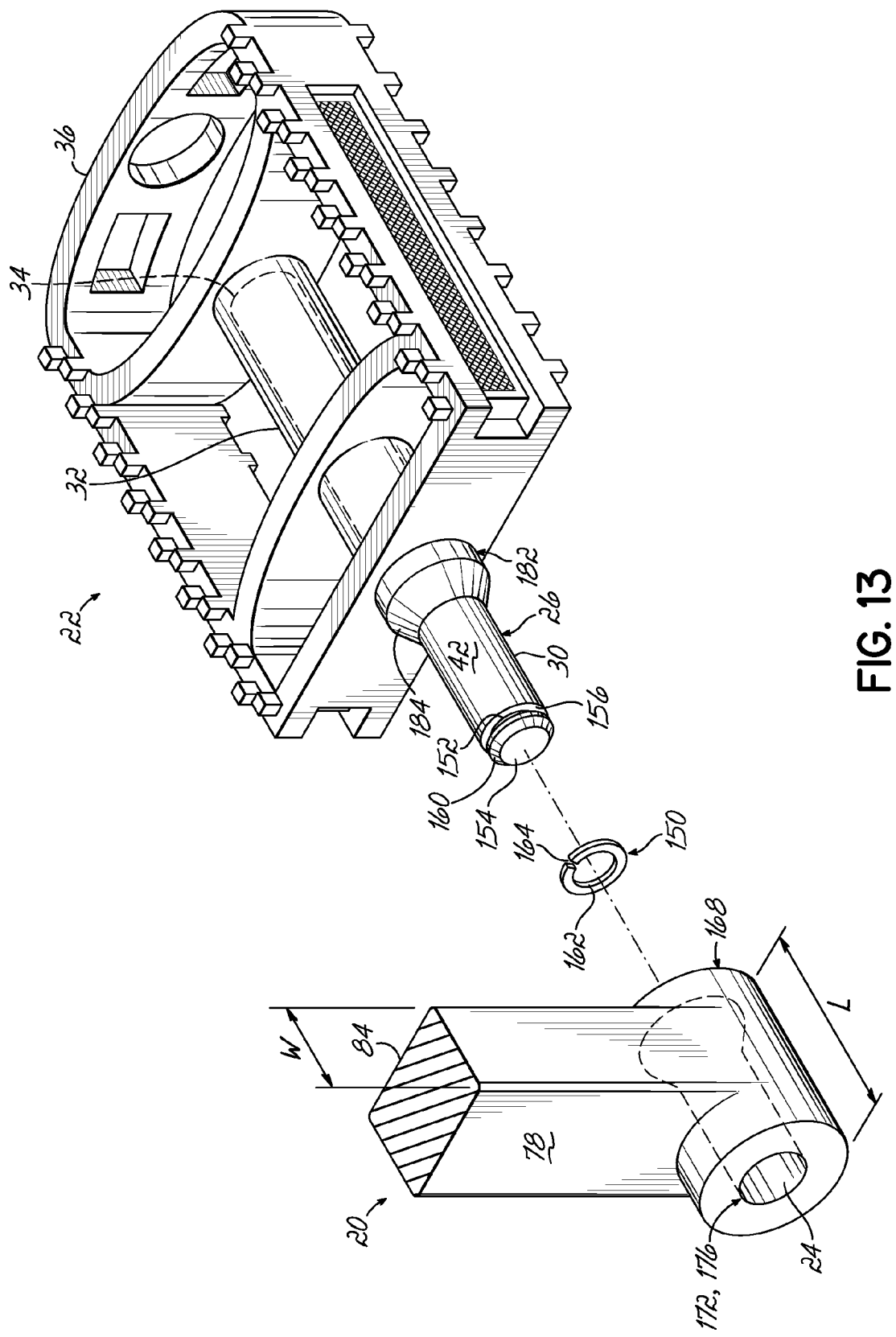
FIG. 13 is a disassembled perspective view of a pedal and crank arm in another embodiment in accordance with aspects of the invention.

In yet another embodiment of a tool-less coupling between a pedal 22 and a crank arm 20 utilizing a spring clip, generally shown at 150, is shown in FIGS. 13-16. As shown in FIG. 13, the first portion 30 of pedal shaft 26 includes a neck 152 and a head 154 adjacent an end thereof. The neck 152 has an outer cross dimension (e.g., diameter) that is less than the outer cross dimension of the first portion 30 adjacent the neck 152 so as to define a first shoulder 156. The head 154 caps the end of the neck 152 and has an outer cross dimension greater than the cross dimension of the neck 152 to define a second shoulder 158. The outer cross dimension of the head 152 may be less than the outer cross dimension of the first portion 30 adjacent the neck 152. The neck 152 between the first and second shoulders 156, 158 is configured to receive the spring clip 150 therein. The head 154 may further include a chamfered end 160 to facilitate insertion of the pedal 22 into bore 24.

As shown in FIG. 13, the spring clip 150 may be configured as a split washer having a central aperture 162 and a slit 164 through the annular ring such that the spring clip 150 is generally C-shaped. The aperture 162 may have a cross dimension which is greater than the outer cross dimension of neck 152, but less than the outer cross dimension of the first portion 30 and head 154. The spring clip 150 may be formed from a suitable material, including various metals or plastics configured to withstand the loads imposed thereon. For example, the spring clip 150 may be formed from a suitable metal including, without limitation, hardened steel, tempered steel, or spring steel. Other materials may also be possible.

The slit 164 provides a spring-like behavior to spring clip 150. In this regard, the slit 164 allows the spring clip to generally expand and contract in, for example, a generally radial direction. More particularly, the slit 164 allows the spring clip 150 to be squeezed to as to effectively bring the ends of slit 164 toward each other. This squeezing and bringing together the ends of the slit 164 effectively reduces the outer cross dimension of the spring clip 150. When the squeezing of the spring clip 150 is released, the ends move away from each other under a resilient bias to effectively increase the outer cross dimension of the spring clip 150. As shown in FIGS. 14-16, when the spring clip 150 is coupled to the pedal 22, the spring clip 150 may be disposed along neck 152 and between the first and second shoulders 156, 158. The spring clip 150 is biased such that at least a portion thereof (e.g., the outer edge portion of the split washer) extends outwardly of the outer surface 42 of the first portion 30 of shaft 26 and outwardly of the head 154.

As shown in FIG. 13, the crank arm 20 may have a slightly different configuration in this embodiment. More particularly, the crank arm 20 may terminate in a generally tubular member 168 having a length L greater than the width W of the crank arm 20 adjacent the tubular member 168. For example, the tubular member 168 may extend away from each of the inner and outer surfaces 78, 84 of crank arm 20. Such a configuration provides for increased contact (e.g., increased surface area) between the pedal 22 and the crank arm 20 so as to reduce or prevent canting or other undesirable movements of the pedal 22 relative to the crank arm 20. The tubular member 168 may be formed integrally with the crank arm 20 or be a separate element which is subsequently coupled to the end of the crank arm 20 through, for example, a welding process.

To facilitate a tool-less coupling between the pedal 22 and the crank arm 20 of the crank assembly 18, the pedal may include a first locking element 170 and the crank arm 20 may include a second locking element 172 that cooperate in a manner that secures the pedal 22 to the crank arm 20 in a tool-less manner. In one embodiment, the first locking element 170 may include an outer edge region of the spring clip 150 along one of its faces. The outer edge region defines a first bearing surface 174 configured to engage a portion of the crank arm 20 when the pedal 22 is coupled thereto. As noted above, at least a portion of the first bearing surface 174 is configured to extend outwardly of the outer surface 42 of the first portion 30 of shaft 26.

In this embodiment, the second locking element 172 may include a region of the inner surface 78 of crank arm 20 adjacent bore 24. In contrast to the previous embodiments, there is no notch or other feature on inner surface 78 configured to mate with the first locking element. Instead, the surface of the inner surface 78 is configured to serve as the second locking element 172. In any event, the inner surface 78 includes a second bearing surface 176 configured to engage a portion of the pedal 22 when the pedal is coupled to the crank arm 20.

The tool-less assembly of the pedal 22 and the crank arm 20 of the pedaled vehicle will now be described for the present embodiment. In an exemplary embodiment, the spring clip 150 may be pre-assembled to the pedal 22 prior to delivery of the pedaled vehicle 10 to the retail outlet. In this regard, the spring clip 150 may be snap fit over the neck 152 so as to reside between the first and second bearing shoulders 156, 158. This may be done, for example, in a tool-less manner. The pedal is then coupled to the crank arm 20 by inserting the first portion 30 of the shaft 26 into the bore 24 of the crank arm 20. The bore 24 has a tapered inlet region 178 adjacent the outer surface 84 that decreases in cross dimension in a direction toward the inner surface 78, and a generally constant cross dimension region 180 following this inlet region 178. The constant cross dimension region 180 has an inner cross dimension slightly greater than the outer cross dimension of the first portion 30 of the shaft 26. For example, in one embodiment, the inner diameter of region 180 may be slightly greater than the outer diameter of the first portion of shaft 26. However, other cross-sectional shapes may be utilized in accordance with aspects of the invention.

The tapered inlet region 178 may serve a couple of purposes. First, the tapered inlet region 178 facilitates insertion of the pedal 22 into the bore 24 in the crank arm 20. For example, inlet region 178 may cooperate with chamfer 160 on head 154 to facilitate insertion. In regard to another purpose, as discussed above and as illustrated in FIG. 14, at least a portion of the spring clip 150 (i.e., its outer edge) projects outwardly of the outer surface 42 of the first portion 30 such that the spring clip 150 must be flexed in order to allow the first portion 30 to pass through the bore 24. The tapered inlet region 178 facilitates this flexing as the pedal 22 is being pushed into bore 24. More particularly, as shown in FIGS. 14-15, as the pedal 22 is being pushed, the outer periphery of the spring clip 150 engages the wall of the tapered inlet region 178 and causes the spring clip 150 to contract generally inward so as to have a decreased cross dimension. When the spring clip 150 reaches the end of the tapered inlet region 178, its cross dimension is sufficiently reduced so as to pass through the constant cross dimension region 180. As the pedal 22 is being pushed toward the crank arm 20, the outer region of the spring clip 150 slides along the wall of the constant cross dimension region 180 in a frictional, but movable manner.

As best illustrated in FIGS. 15 and 16, when the pedal 22 nears its fully seated position relative to crank arm 20, the spring clip 150, which is flexed inwardly as the clip 150 traverses bore 24, comes to the end of bore 24 and snaps outwardly when positioned outside of bore 24 so as to be adjacent inner surface 78. When so positioned, the first bearing surface 174 of the spring clip 150 is in confronting relationship with the second bearing surface 176 of the crank arm 20. In one embodiment, the bearing surfaces 174, 176 may engage each other. In another embodiment, the bearing surfaces 172, 174 may be slightly spaced from one another (not shown).

In any event, when the spring clip 150 snaps back out after passing through bore 24, the pedal 22 is secured to the crank arm 20. In this regard, if the pedal 22 is pushed inwardly (i.e., toward crank arm 20) a shoulder 182 formed on the first portion 30 of shaft 26 is configured to engage the bore 24 and/or the outer surface 84 of the crank arm 20 so as to prevent or limit any substantial inward movement of the pedal 22. More particularly, in this embodiment, the shoulder 182 includes a tapered portion 184 configured to mate with the tapered inlet region 178 of bore 24 so as to prevent or limit any substantial inward movement of the pedal 22. In a similar manner, if the pedal 22 is pulled outwardly (i.e., away from crank arm 20) the bearing surfaces 174, 176 engage each other so as to prevent or limit any substantial outward movement of the pedal 22. Thus, the pedal is securely coupled to the crank arm 20.

As noted above, in this embodiment, the spring clip 150 does extend above the inner surface 78 of the crank arm 20. However, given the design of spring clip 150, it is believed that the chances of unintentional disengagement of the locking elements that secure the pedal 22 to the vehicle 20 are extremely low. In any event, a notch similar to the notch shown in FIGS. 8 and 9 may also be provided such that the spring clip 150 does not extend above the inner surface 78. Such a design may make removal of the pedal 22 from the vehicle 10 more challenging. As it stands, if a rider desired to remove the pedals 22 from the pedaled vehicle 10, such as to insert new or different pedals, the spring clip 150 may be squeezed inwardly, such as with a suitable tool (e.g., pliers of the like), to thereby reduce its cross dimension and allow it to again pass back through bore 24.

In accordance with an aspect of the invention, the coupling of the pedal 22 to the crank arm 20 may be achieved in a tool-less manner. In this regard, the amount of force that it takes to push the first portion 30 of the shaft 26 into bore 24 in crank arm 20 is configured to be within the capacity of an adult person using his or her hands. Based on the above description, it should be appreciated that the coupling of the pedal 22 to the vehicle 10 is therefore quick, relatively easy to understand and implement, and achieved without the need of any tools. Additionally, the mechanism(s) that provide for the tool-less assembly are relatively simple in their design and cost-effective in regard to manufacturing and implementation.

Figure 17:
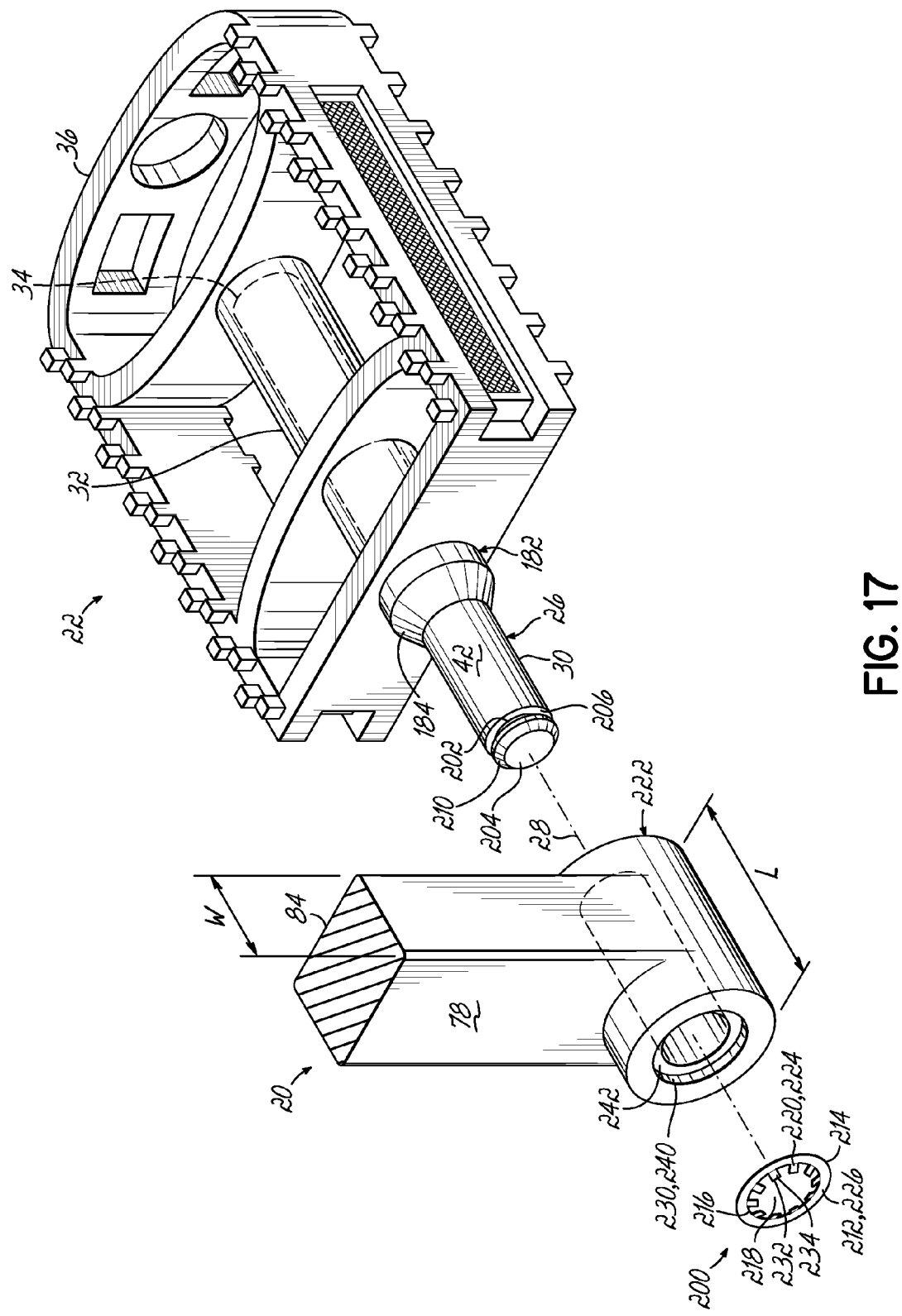
FIG. 17 is a disassembled perspective view of a pedal and crank arm in another embodiment in accordance with aspects of the invention.

A further embodiment of a tool-less coupling between a pedal 22 and a crank arm 20 utilizing a spring clip, generally shown at 200, is shown in FIGS. 17-20. As shown in FIG. 17, the first portion 30 of pedal shaft 26 includes a neck 202 and a head 204 adjacent an end thereof. The neck 202 has an outer cross dimension (e.g., diameter) that is less than the outer cross dimension of the first portion 30 adjacent the neck 202 so as to define a first shoulder 206. The head 204 caps the end of the neck 202 and has an outer cross dimension greater than the cross dimension of the neck 202 to define a second shoulder 208. In an exemplary embodiment, the outer cross dimension of the head 202 may be substantially equal to the outer cross dimension of the first portion 30 adjacent the neck 202.

In this regard, the neck 202 may be a groove formed in the (generally constant diameter) outer surface 42 of first portion 30. The head 204 may further include a chamfered end 210 to facilitate insertion of the pedal 22 into bore 24.

Unlike the previous embodiments, the spring clip 200 may not be fixedly secured to the pedal 22 (such as with a threaded fastener, see FIGS. 2, 6, and 10, for example), but instead may be a separate element that couples the pedal 22 to the crank arm 20, as described below. As shown in FIG. 17, the spring clip 200 may be generally disc shaped having a main body 212 configured as an annular ring defining an outer edge 214 and an inner edge 216 that defines a central aperture 218. In one embodiment, the main body 212 may be generally circular in shape and may be generally planar at its ends. However, it should be recognized that other arrangements may exist and remain within the scope of the invention.

In one embodiment, a plurality of tabs 220 extends inwardly from the inner edge 216 of the main body 212. For example, the tabs 220 may be circumferentially spaced around the inner edge 216, such as in a uniform manner. Other arrangements are possible, however. Additionally, at least a portion of the tabs 220 may extend outside of the plane defined by the main body 212 such that an angle is formed between the main body 212 and the tabs 220 (e.g., see FIGS. 17 and 18). In an exemplary embodiment, the tabs 220 may all be angled in the same direction. The spring clip 200 may be formed from a suitable material, including various metals or plastics configured to withstand the loads imposed thereon. For example, the spring clip 200 may be formed from a suitable metal including, without limitation, hardened steel, tempered steel, or spring steel. Other materials may also be possible.

Figure 18:
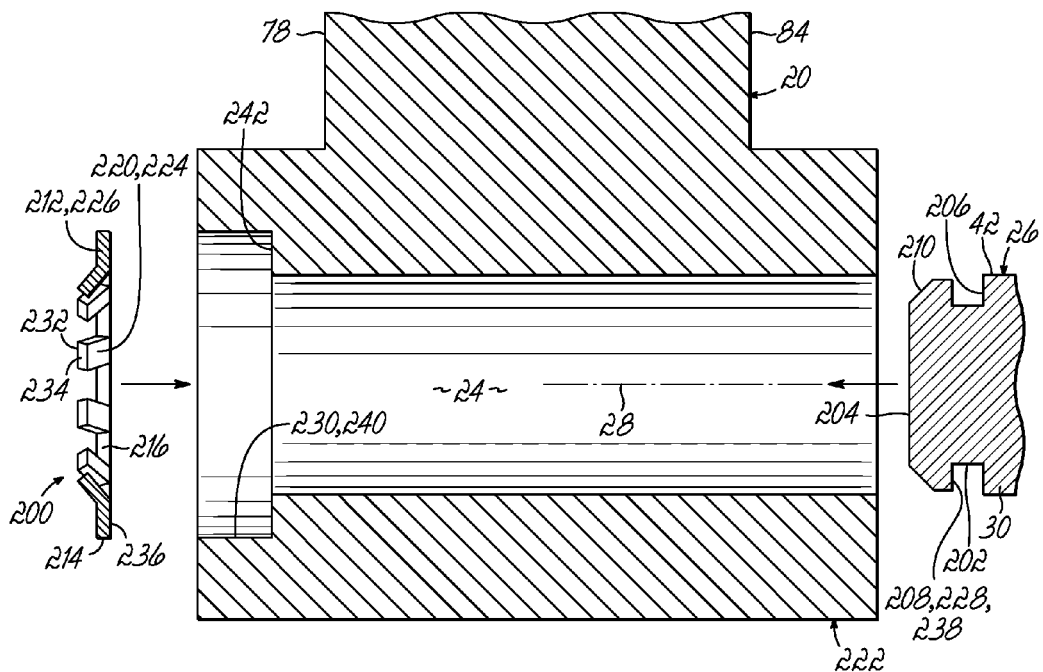
FIG. 18 is a cross-sectional view illustrating assembly of a pedal to a crank in a tool-less manner according to the embodiment shown in FIG. 17.
Figure 19:
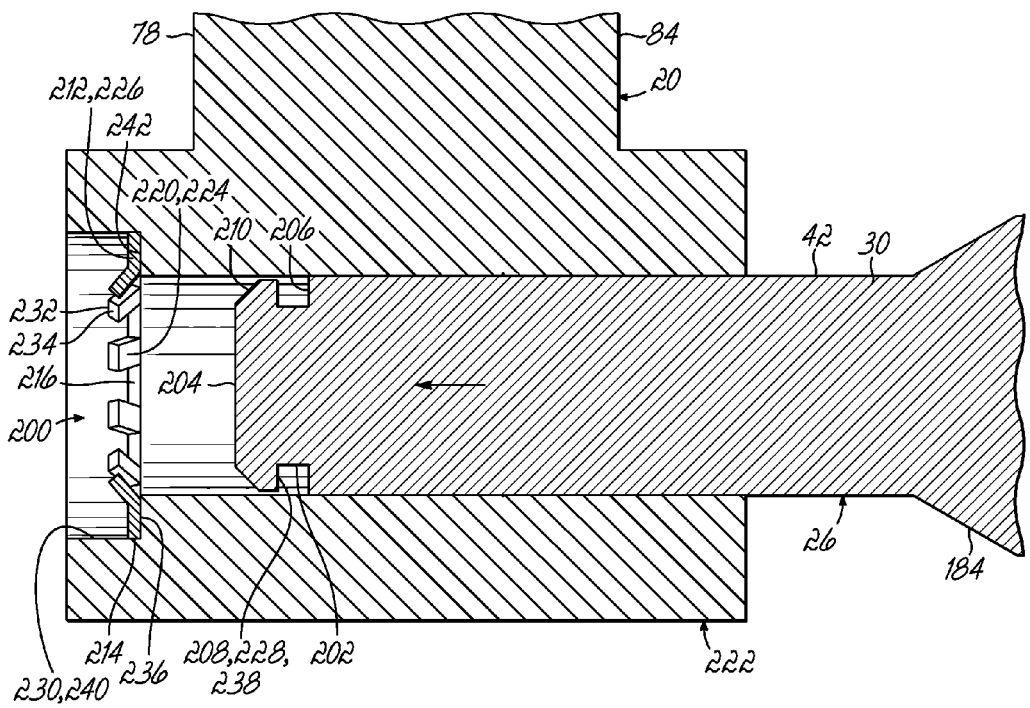
FIG. 19 is another cross-sectional view illustrating assembly of the pedal shown in FIG. 17 to the crank in a tool-less manner.

The configuration of the tabs 220 (as well as possibly the material selection and/or dimensions of the tabs) provide a spring-like behavior to spring clip 200 in that the tabs 220 have some level of flexibility. The tabs 220 extend inwardly from the inner edge 216 of main body 212 at an angle so as to also generally extend in a preferred direction (e.g., toward the inner surface 78 of the crank arm 20 as illustrated in FIGS. 18 and 19). This configuration of the tabs 220 encourages flexing of the tabs 220 generally outwardly away from central axis 28 but discourages flexing of the tabs 212 generally inwardly toward the central axis 28, as will be explained below.

Thus, the spring clip 200, and more particularly, the tabs 220 thereof operate as a spring capable of flexing and resilient biasing similar to the previous embodiment.

As shown in FIG. 17, the crank arm 20 may have a configuration similar to that of the previous embodiment. More particularly, the crank arm 20 may terminate in a generally tubular member 222 having a length L greater than the width W of the crank arm 20 adjacent the tubular member 222. For example, the tubular member 222 may extend away from one or both of the inner and outer surfaces 78, 84 of crank arm 20 (one shown). Such a configuration provides for increased contact (e.g., increased surface area) between the pedal 22 and the crank arm 20 so as to reduce or prevent canting or other undesirable movements of the pedal 22 relative to the crank arm 20. The tubular member 222 may be formed integrally with the crank arm 20 or be a separate element which is subsequently coupled to the end of the crank arm 20 through, for example, a welding process. In an alternate embodiment, however, the crank arm 20 may have a more conventional configuration, such as that shown in FIG. 6, for example.

To facilitate a tool-less coupling between the pedal 22 and the crank arm 20 of the crank assembly 18, the spring clip 200 may include a first locking element 224 and a second locking element 226 that cooperate with a third locking element 228 on the pedal 22 and a fourth locking element 230 on the crank arm 20 so as to secure the pedal 22 to the crank arm 20 in a tool-less manner. In one embodiment, the first locking element 224 may include one or more of the tabs 220 extending from the inner edge 216 of the main body 212 of the spring clip 200. The tabs 220 define a first bearing surface 232 at the free end 234 thereof configured to engage a portion of the pedal 22 when the pedal is coupled to the crank arm 20. The second locking element 226 may include a portion of the main body 212, such as an outwardly facing surface of the main body 212. This outer surface of the main body 212 defines a second bearing surface 236 configured to engage a portion of the crank arm 20 when the pedal 22 is coupled thereto.

In this exemplary embodiment, the third locking element 228 may include a portion of the neck 202 formed in the first portion 30 of pedal 22. More particularly, the third locking element 228 may include a portion of shoulder 208. In this regard, the shoulder 208 defines a third bearing surface 238 configured to engage a portion of the spring clip 200 when the pedal 22 is coupled to the crank arm 20. Furthermore, the fourth locking element 230 may include at least one notch 240 formed in the inner surface 78 of crank arm 20 adjacent bore 24. The notch 240 may be configured as an annular ring extending substantially the full circumference of bore 24. The effect of the at least one notch 240 is to define a first bore portion having a first cross dimension and a second bore portion, formed by the at least one notch 240, having a second cross dimension greater than the first cross dimension. The notch 240 includes a fourth bearing surface 242 configured to engage a portion of the spring clip 200 when the pedal 22 is coupled to the crank arm 20. For purposes described in more detail below, the fourth bearing surface 242 is positioned below the inner surface 78 of the crank arm 20 so as to be inset therefrom.

The tool-less assembly of the pedal 22 and the crank arm 20 of the pedaled vehicle will now be described for the present embodiment. As noted above, the spring clip 200 is not pre-assembled to the pedal 22. Instead, the spring clip 200 may be positioned within the notch 240 in the crank arm 20. More particularly, the spring clip 200 may be positioned within the notch 240 such that second bearing surface 236 on the main body 212 of the spring clip 200 engages the fourth bearing surface 242 defined by the notch 240 in the crank arm 20. Additionally, the spring clip 200 may be oriented such that the tabs 220 extend out of the plane of the main body 212 so as to be directed toward the inner surface 78 of the crank arm, as illustrated in FIGS. 18 and 19. It is anticipated that the positioning of the spring clip 200 within the notch 240 may be achieved using the finger or fingernail of the person assembling the pedal.

With the spring clip 200 so positioned, the pedal 22 is then coupled to the crank arm 20 by inserting the first portion 30 of the shaft 26 into the bore 24 of the crank arm 20. The bore 24 has an inner cross dimensions slightly greater than the outer cross dimension of the first portion 30 of the shaft 26. For example, in one embodiment, the inner diameter of bore 24 may be slightly greater than the outer diameter of the first portion 30 of shaft 26. The invention, however, is not limited to circular cross dimensions as other cross-sectional shapes may be utilized in accordance with aspects of the invention.

As illustrated in FIG. 19, at least a portion of the tabs 220 projects inwardly into bore 24 such that at least a portion of the tabs 220 engages the outer surface 42 of first portion 30 when the pedal 22 is being coupled to the crank arm 20. Due to the features of the spring clip 200, however, the tabs 220 are able to flex outwardly so as to allow the first portion 30 of shaft 26 to pass through the bore 24. In this regard, and as noted above, the generally angled configuration of the tabs 220 relative to main body 212 facilitates flexing of the tabs 220 outwardly as a result of engagement of the tabs 220 with the outer surface 42 of first portion 30. As the pedal 22 is being pushed toward the crank arm 20, the tabs 220 engage the chamfered end of the first portion 30 and slide along the outer surface 42 of the head 204 thereof in a frictional, but movable manner.

Figure 20:
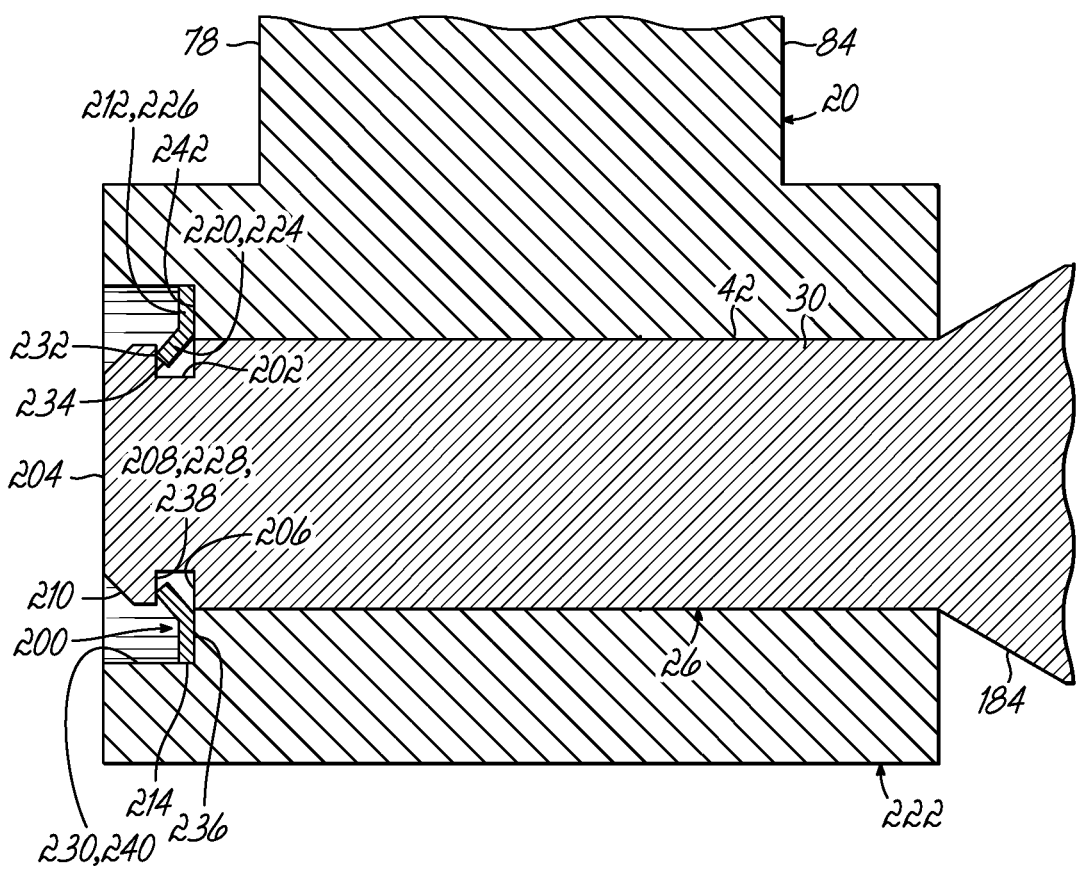
FIG. 20 is another cross-sectional view illustrating assembly of the pedal shown in FIG. 17 to the crank in a tool-less manner.

As best illustrated in FIGS. 19 and 20, when the pedal 22 nears its fully seated position relative to crank arm 20, the tabs 220, which are flexed outwardly as the pedal 22 is inserted into bore 24, encounter the neck 202 such that the tabs 220 of the spring clip 220 snap inwardly so as to be positioned within neck 202 between the first and second shoulders 206, 208. When so positioned, the first bearing surface 232 of the tabs 220 is in confronting relationship with the third bearing surface 238 on shoulder 208. Additionally, the second bearing surface 236 on the main body 212 of spring clip 200 is in confronting relationship with the fourth bearing surface 242 of notch 240. In one embodiment, the bearing surfaces 232, 238 and 236, 242 may engage each other. In another embodiment, the bearing surfaces 232, 238 and 236, 242 may be slightly spaced from one another (not shown).

In any event, when the tabs 220 snap fit into the neck 202 of first portion 30, the pedal 22 is secured to the crank arm 20. In this regard, if the pedal 22 is pushed inwardly (i.e., toward crank arm 20), a shoulder 82 formed on the first portion 30 of shaft 26 is configured to engage the outer surface 84 of the crank arm 20 so as to prevent or limit any substantial inward movement of the pedal 22. In a similar manner, if the pedal 22 is pulled outwardly (i.e., away from crank arm 20), the bearing surfaces 232, 238 and 236, 242 engage each other so as to prevent or limit any substantial outward movement of the pedal 22. Thus, the pedal 22 is securely coupled to the crank arm 20.

When the pedal 22 is fully seated within the bore 24 of the crank arm 20, no portion of the pedal 22 may extend above the inner surface 78 of the crank arm 20. More particularly, and as shown in FIG. 20, the tabs 220 are position within the bore 24 and the neck 202 positioned on stem 26 such that the end of the pedal 22 adjacent head 204 lies along or below a plane generally defined by the inner surface 78 of the crank arm 20.

In accordance with an aspect of the invention, the coupling of the pedal 22 to the crank arm 20 in this embodiment may be achieved in a tool-less manner. In this regard, the amount of force that it takes to push the first portion 30 of the shaft 26 into bore 24 in crank arm 20 is configured to be within the capacity of an adult person using his or her hands. Based on the above description, it should be appreciated that the coupling of the pedal 22 to the vehicle 10 is therefore quick, relatively easy to understand and implement, and achieved without the need of any tools. Additionally, the mechanisms that provide for the tool-less assembly are relatively simple in their design and cost-effective in regard to manufacturing and implementation.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art.

Thus, the various features of the invention may be used alone or in any combination depending on the needs and preferences of the user.

What is claimed is:

1. A pedaled vehicle, comprising:
a frame;
at least one wheel rotatably coupled to the frame;
a crank assembly operatively coupled to the at least one wheel for moving the vehicle and having a bore;
a pedal having a shaft configured to be received in the bore of the crank assembly; and
a spring clip secured to the pedal by a fastener for securing the pedal to the crank assembly, the spring clip including a circumferentially continuous main body having at least one of an inner edge and an outer edge, and a plurality of flexible tabs extending from one of the inner or outer edge and capable of flexing between a first configuration and a second configuration,
wherein when the flexible tabs are in the first configuration, the pedal shaft is allowed to pass through the bore of the crank assembly, and when the flexible tabs are in the second configuration, the pedal shaft is prevented from being removed from the bore of the crank assembly.

2. The pedaled vehicle of claim 1, wherein the flexible tabs are acutely angled with respect to a longitudinal axis of the bore.

3. The pedaled vehicle of claim 1, wherein the spring clip includes a disc-shaped main body having an outer edge, the plurality of tabs extending from the outer edge of the main body.

4. The pedaled vehicle of claim 1, wherein the spring clip is entirely positioned within the confines of the crank assembly.

5. The pedaled vehicle of claim 1, wherein the flexible tabs are directed toward a centerline of the bore.

6. A pedaled vehicle, comprising:
a frame;
at least one wheel rotatably coupled to the frame;
a crank assembly operatively coupled to the at least one wheel for moving the vehicle and having a bore;
a pedal having a shaft configured to be received in the bore of the crank assembly; and
a spring clip for securing the pedal to the crank assembly, the spring clip including at least one flexible tab or leg capable of flexing between a first configuration and a second configuration,
wherein when the flexible tab or leg is in the first configuration, the pedal shaft is allowed to pass through the bore of the crank assembly, and when the flexible tab or leg is in the second configuration, the pedal shaft is prevented from being removed from the bore of the crank assembly, and
wherein the pedal shaft includes a head larger than an adjacent portion of the shaft to define a shoulder, the at least one flexible tab engaging the shoulder when the pedal is secured to the crank assembly.

7. The pedaled vehicle of claim 6, wherein the head has a chamfered end that cams the at least one tab to the first configuration during insertion of the pedal into the bore.

8. A pedaled vehicle, comprising:
a frame;
at least one wheel rotatably coupled to the frame;
a crank assembly operatively coupled to the at least one wheel for moving the vehicle and having a bore;
a pedal having a shaft configured to be received in the bore of the crank assembly; and
a spring clip for securing the pedal to the crank assembly, the spring clip including at least one flexible tab or leg capable of flexing between a first configuration and a second configuration, wherein when the flexible tab or leg is in the first configuration, the pedal shaft is allowed to pass through the bore of the crank assembly, and when the flexible tab or leg is in the second configuration, the pedal shaft is prevented from being removed from the bore of the crank assembly, and wherein the bore has a first bore portion having a first cross dimension and a second bore portion with a second cross dimension that is larger than the first cross dimension, the at least one flexible tab or leg being in the second bore portion when in the second configuration.

9. The pedaled vehicle of claim 8, wherein the spring clip includes a plurality of flexible tabs or legs.

10. The pedaled vehicle of claim 8, wherein the crank assembly includes a notch to define the second bore portion, the notch being configured as an annular ring or discrete notch segments.

11. A pedaled vehicle, comprising:
a frame;
at least one wheel rotatably coupled to the frame;
a crank assembly operatively coupled to the at least one wheel for moving the vehicle and having a bore;
a pedal having a shaft configured to be received in the bore of the crank assembly; and
a spring clip for securing the pedal to the crank assembly, the spring clip including at least one flexible tab or leg capable of flexing between a first configuration and a second configuration,
wherein when the flexible tab or leg is in the first configuration, the pedal shaft is allowed to pass through the bore of the crank assembly, and when the flexible tab or leg is in the second configuration, the pedal shaft is prevented from being removed from the bore of the crank assembly, and
wherein the spring clip has a U-shaped configuration and further comprises:
a straight, elongate base portion; and
a pair of flexible legs on opposed ends of the base portion.

12. A method of coupling a pedal to a vehicle in a tool-less manner, comprising:
coupling a spring clip to the pedal;
flexing a tab or leg of the spring clip to a first configuration so that the spring clip is in a tensioned state;
inserting a shaft of the pedal into the bore of the vehicle when the spring clip is in the first configuration, wherein the spring clip is coupled to the pedal prior to inserting the pedal onto the bore of the vehicle; and
reducing the tension in the spring clip so that the tab or leg moves to a second configuration, the shaft of the pedal inserted into the bore of the vehicle being restricted from moving out of the bore when the spring clip is in the second configuration.

13. The method of claim 12, wherein flexing a tab or leg of the spring clip further comprises contacting the tab or leg of the spring clip with the bore to flex the spring clip to the first configuration.

14. The method of claim 12, wherein reducing the tension in the spring clip further comprises engaging the tab or leg of the spring clip with a notch in the bore of the vehicle.

* * * * *